(12) United States Patent
Hou et al.

(10) Patent No.: US 10,881,995 B2
(45) Date of Patent: Jan. 5, 2021

(54) FILTER CARTRIDGE ENDPLATE WITH INTEGRATED FLOW STRUCTURE

(71) Applicant: Cummins Filtration IP Inc., Columbus, IN (US)

(72) Inventors: Penghua Hou, Shanghai (CN); Yiyun Zhang, Shanghai (CN); Ping Shen, Zhejiang (CN); Kevin C. South, Cookeville, TN (US); Ismail Bagci, Cookeville, TN (US); Charles W. Hawkins, Sparta, TN (US); Gerard Malgorn, Quimper (FR); Zemin Jiang, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 292 days.

(21) Appl. No.: 15/909,405

(22) Filed: Mar. 1, 2018

(65) Prior Publication Data
US 2018/0185776 A1 Jul. 5, 2018

Related U.S. Application Data

(63) Continuation of application No. 14/372,834, filed as application No. PCT/CN2012/071499 on Feb. 23, 2012, now Pat. No. 9,925,481.

(51) Int. Cl.
*B01D 35/30* (2006.01)
*B01D 29/58* (2006.01)
*B01D 29/23* (2006.01)

(52) U.S. Cl.
CPC ............. *B01D 35/30* (2013.01); *B01D 29/23* (2013.01); *B01D 29/58* (2013.01); *B01D 2201/291* (2013.01); *B01D 2201/295* (2013.01)

(58) Field of Classification Search
CPC .. B01D 29/21; B01D 35/30; B01D 2201/291; B01D 2201/302; B01D 29/395; B01D 2313/04; B01D 63/021
See application file for complete search history.

(56) References Cited

U.S. PATENT DOCUMENTS 3,167,507 A * 1/1965 Burhans ............... B01D 35/153
210/117
4,094,791 A   6/1978 Conrad
(Continued)

OTHER PUBLICATIONS

Office Action issued for Indian Patent Application No. 3880/CHENP/2014, dated Dec. 18, 2018, 5 pages.
(Continued)

*Primary Examiner* — Ana M Fortuna
(74) *Attorney, Agent, or Firm* — Foley & Lardner LLP

(57) ABSTRACT

A filter cartridge endplate (12) is described herein that has an integrated flow structure. For example, the integrated flow structure has concentric flow portions disposed at a center of the endplate (12), where a separator (10) is built into the endplate (12) that separates fluid flow. The endplate (12) includes a plate with a major surface, it separator (10) that protrudes axially away from the major surface. The separator (10) includes a first flow portion (14) and a second flow portion (16), where the first flow portion (14) is disposed radially inward relative to the second flow portion (16). The first flow portion (14) includes a channel (22) and the second flow portion includes a channel (24). The respective channels (22,24) are configured to allow axial fluid flow relative to the plate, and configured to allow fluid flow that is localized toward the center of the plate (12).

14 Claims, 23 Drawing Sheets

(56) References Cited

U.S. PATENT DOCUMENTS

| | | | |
|---|---|---|---|
| 4,253,954 A | 3/1981 | Midkiff et al. | |
| 4,522,712 A | 6/1985 | Fischer et al. | |
| 4,735,716 A * | 4/1988 | Petrucci | B01D 35/30 |
| | | | 210/232 |
| 4,743,374 A | 5/1988 | Stifelman | |
| 5,484,527 A * | 1/1996 | Janik | B01D 27/08 |
| | | | 210/232 |
| 5,609,760 A | 3/1997 | Leach | |
| 6,571,962 B2 | 6/2003 | Thomas | |
| 8,231,793 B2 | 7/2012 | Hacker et al. | |
| 8,333,980 B2 | 12/2012 | Van Nest et al. | |
| 8,920,648 B2 | 12/2014 | Thomas et al. | |
| 8,932,465 B2 | 1/2015 | Wells et al. | |
| 9,925,481 B2 * | 3/2018 | Hou | B01D 35/30 |
| 2007/0227963 A1 * | 10/2007 | Fick | B01D 29/21 |
| | | | 210/433.1 |
| 2010/0101993 A1 * | 4/2010 | Wells | B01D 29/21 |
| | | | 210/455 |
| 2010/0200490 A1 | 8/2010 | Martin et al. | |
| 2011/0042329 A1 | 2/2011 | Hacker et al. | |
| 2015/0096932 A1 | 4/2015 | Hou et al. | |
| 2018/0185776 A1 * | 7/2018 | Hou | B01D 29/23 |

OTHER PUBLICATIONS

Chinese Office Action issued in CN2012800648579, dated Jun. 24, 2016.

International Search Report and Written Opinion issued for PCT/CN2012/071499, dated Nov. 29, 2012, 11 pages.

\* cited by examiner

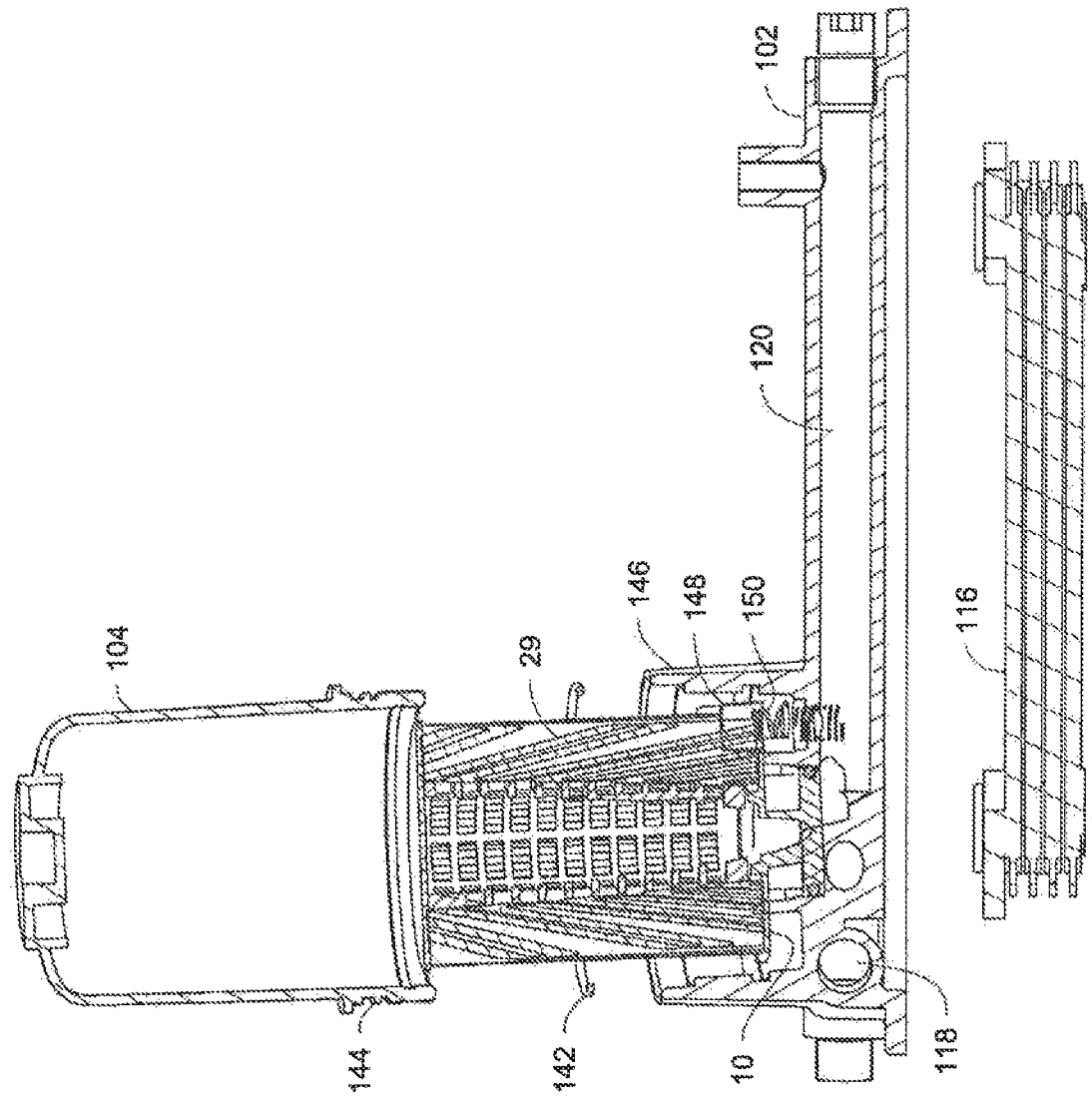

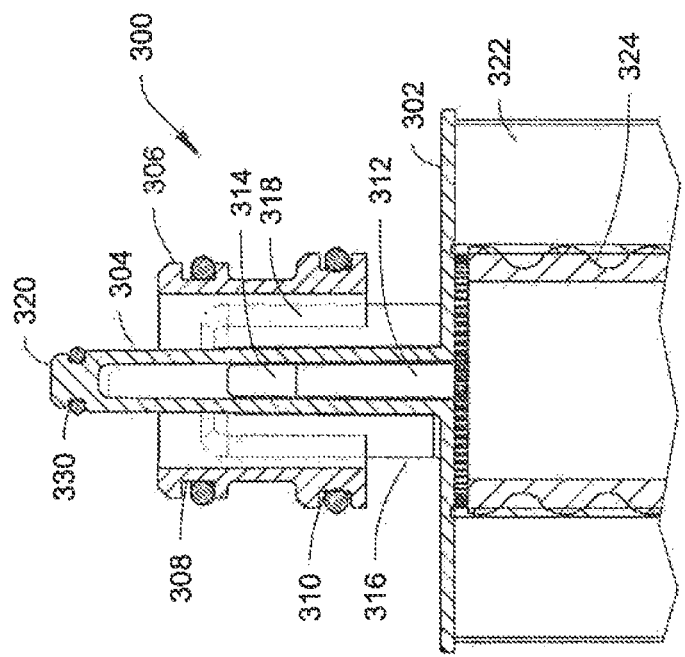
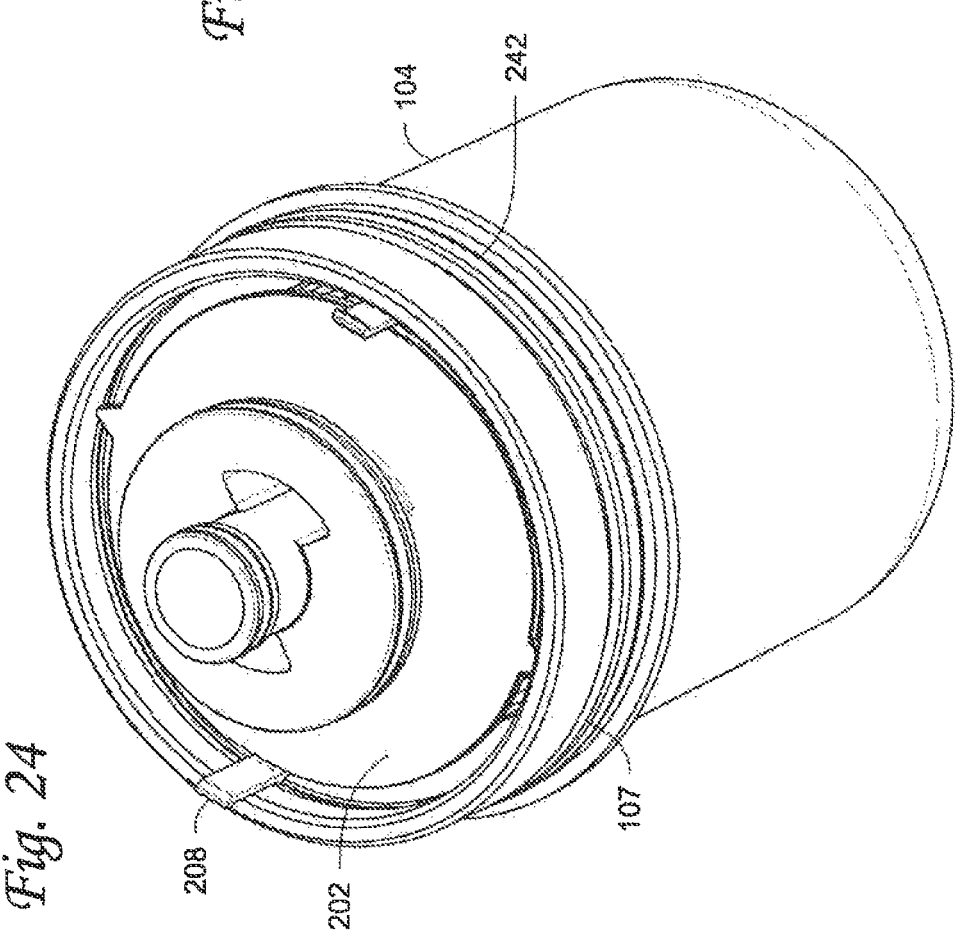

US 10,881,995 B2

FILTER CARTRIDGE ENDPLATE WITH INTEGRATED FLOW STRUCTURE

CROSS REFERENCE TO RELATED APPLICATIONS

The present application is a continuation of U.S. patent application Ser. No. 14/372,834, filed Jul. 17, 2014, which is a National Stage of PCT Application No. PCT/CN2012/071499, filed Feb. 23, 2012. The contents of all three applications are incorporated herein by reference in their entirety.

FIELD

The disclosure herein relates to an endplate for a fluid filter cartridge. Particularly, the endplate has an integrated flow structure. The integrated flow structure has concentric flow portions disposed at the center of the endplate, where the flow portions each have a channel, and where the channels separate fluids that enter and exit the filter cartridge, or that separate fluids that exit the filter cartridge. The integrated flow structure of the endplate has a separator built into the endplate that separates the flow configuration. For example, the integrated flow structure can allow for a working fluid to be filtered by the filter cartridge to flow toward the center of the endplate and into the filter cartridge, and can allow for filtered fluid to flow through the center of the endplate and out of the filter cartridge. The separator for example can also direct the working fluid away from the center of the endplate and toward the sides of the filter cartridge.

BACKGROUND

Fluid filter cartridges are well known, such as for example, as employed in protected systems of engines, used for fluid filtration, including for example filtration of oil, fuel, coolant, air, exhaust fluids, hydraulic fluids, crankcase ventilation and condensates, and intake air.

Improvements can be made to the flow structure to and from a fluid filter cartridge.

SUMMARY

Generally, a filter cartridge endplate is described herein that has an integrated flow structure. For example, the integrated flow structure has a separator composed of concentric flow portions disposed toward a center of the endplate, where the separator is built into the endplate and separates fluid flow, Among other advantages, improved flow characteristics and ease of maintenance can be obtained by the endplate structure, filter cartridge and filtration module configurations described herein.

In one embodiment, a filter cartridge endplate with an integrated flow structure comprises a plate with a major surface, and a separator that protrudes axially away from the major surface. The separator includes a first flow portion and a second flow portion. The first flow portion is disposed radially inward relative to the second flow portion. The first and second flow portions are concentrically arranged relative to the plate. The first and second flow portions are disposed toward a center of the major surface. The first flow portion includes a channel and the second flow portion includes a channel. The respective channels are configured to allow axial fluid flow relative to the plate, and configured to allow fluid flow that is localized toward the center of the plate.

In one embodiment of the endplate according to any of the above, the first flow portion and the second flow portion are configured to allow a fluid to be filtered to flow toward the center of the plate and through the channel of the first flow portion, and configured to allow filtered fluid to flow through the center of the plate and out of the filter cartridge.

In another embodiment of the endplate according to any of the above, at least one of the first flow portion and the second flow portion includes a side opening in fluid communication with the respective channel. In one embodiment, the side opening is configured to direct the fluid away from the center of the plate and toward its sides.

In one embodiment, a filter cartridge comprises a filter media with an endplate disposed on each end thereof, such that one of the endplates comprises the endplate of according to any of the above.

The endplate structure above can improve the flow configuration to and from a filter cartridge, and can make servicing and maintenance more convenient and clean.

In one embodiment, a filtration module comprises the filter cartridge above. In one embodiment, the filtration module is an oil filter and cooler module. The arrangement of the filter cartridge within the filtration module can improve fluid flow, heat exchange, and servicing.

BRIEF DESCRIPTION OF THE DRAWINGS

FIG. 17 is a side sectional view of the filtration module of FIG. 7 shown in one example of an exploded view.

FIG. 24 is an end perspective view of the endplate and housing of FIG. 23.

FIG. 25 is a sectional view of another embodiment of a filter cartridge endplate shown connected as part of a filter cartridge, partially shown.

DETAILED DESCRIPTION

Figure 1:
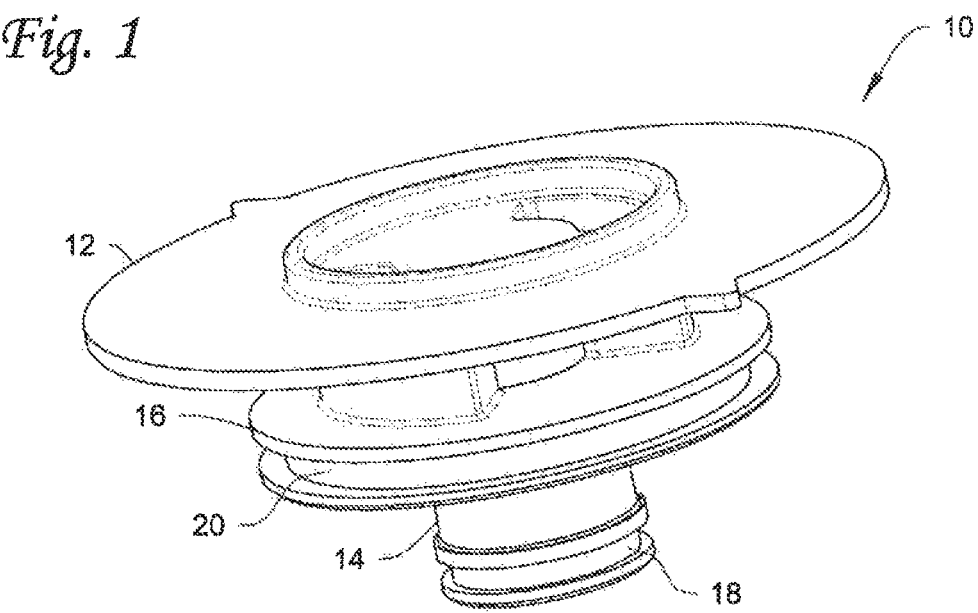
FIG. 1 is a perspective view of one embodiment of a filter cartridge endplate.
Figure 2:
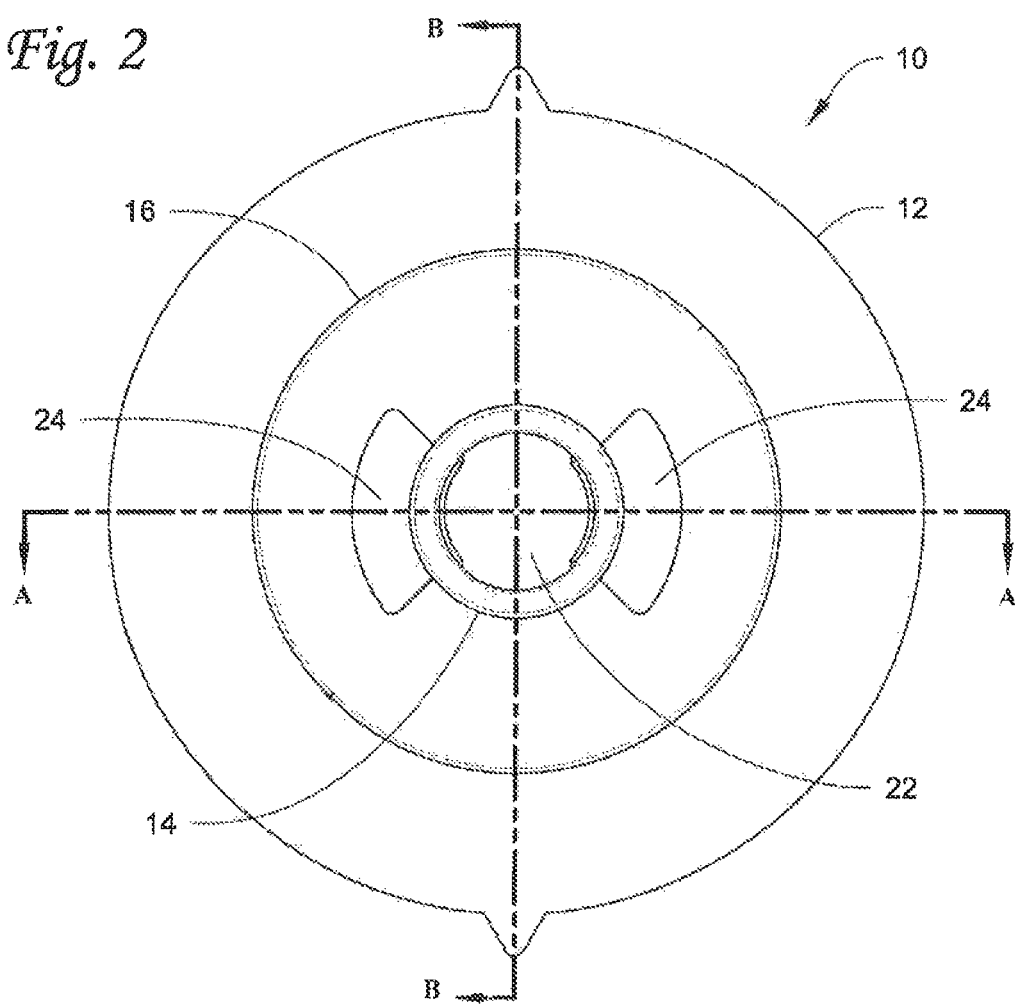
FIG. 2 is a bottom view of the endplate of FIG. 1.

Generally, a filter cartridge endplate as described herein has an integrated flow structure. For example, the integrated flow structure has concentric flow portions disposed at the center of the endplate, where a separator is built into the endplate that separates fluid flow.

For example, the flow portions form channels that separate fluids that enter and exit the filter cartridge. The integrated flow structure can allow for a working fluid to be filtered by the filter cartridge to flow toward the center of the endplate and into the filter cartridge and can allow for filtered fluid to flow through the center of the endplate and out of the filter cartridge. The separator for example can also direct the working fluid away from the center of the endplate and toward the sides of the filter cartridge.

FIGS. 1-4 show one embodiment of an integrated flow structure built within an endplate 12. The integrated flow structure includes a separator 10 that can generally be constructed to resemble a spud that protrudes axially away from a major surface of the endplate 12. In the embodiment shown, the separator 10 is disposed about a center of the endplate. In one example, the separator 10 extends axially from and may be centered along a center line through the endplate. See FIGS. 3 and 4.

The separator 10 includes a first flow portion 14 connected to a second flow portion 16. In one embodiment, the first flow portion 14 may be an inlet for a fluid to be filtered. The first flow portion 14 directs fluid to enter a filter cartridge to which the endplate 12 is connected. In one embodiment, the second flow portion 16 may be an outlet for a fluid that has been filtered to be directed from the filter cartridge to which the endplate 12 is connected. For ease of description, the first flow portion 14 and second flow portion 16 are described as an inlet and outlet respectively. However it will be appreciated that both the first flow portion 14 and second flow portion 16 may be employed as outlets for separate fluids, such as for example when another inlet may be employed.

As shown, the first flow portion 14 is disposed radially inward relative to the second flow portion 16. The first flow portion 14 has an inlet formed by channel 22 and the second flow portion 16 has an outlet formed by channel 24, In one embodiment, the first flow portion 14 and second flow portion 16 are concentrically arranged. See FIGS. 2 and 4. For example, fluid to be filtered can enter the endplate structure through the inlet available through channel 22, and filtered fluid can exit through the endplate 12 and through the outlet available through the channel 24. In one embodiment, there are two channels 24. See FIGS. 2 and 4. In one example, the channels 22, 24 allow for axial flow to and from the endplate 12, and that is localized toward the center of the endplate 12.

Figure 3:
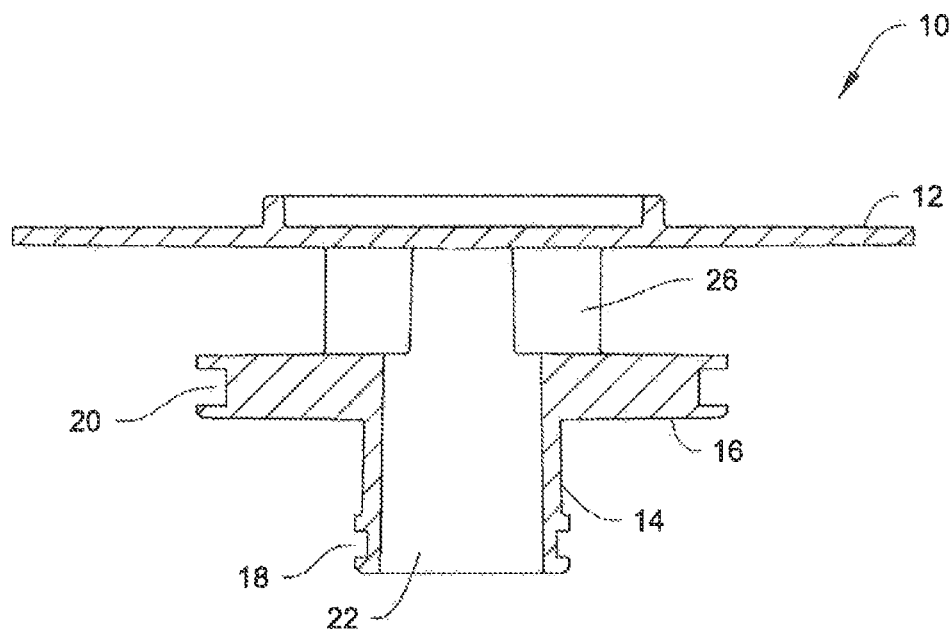
FIG. 3 is a sectional view of the endplate of FIG. 1 taken from line B-B of FIG. 2.
Figure 4:
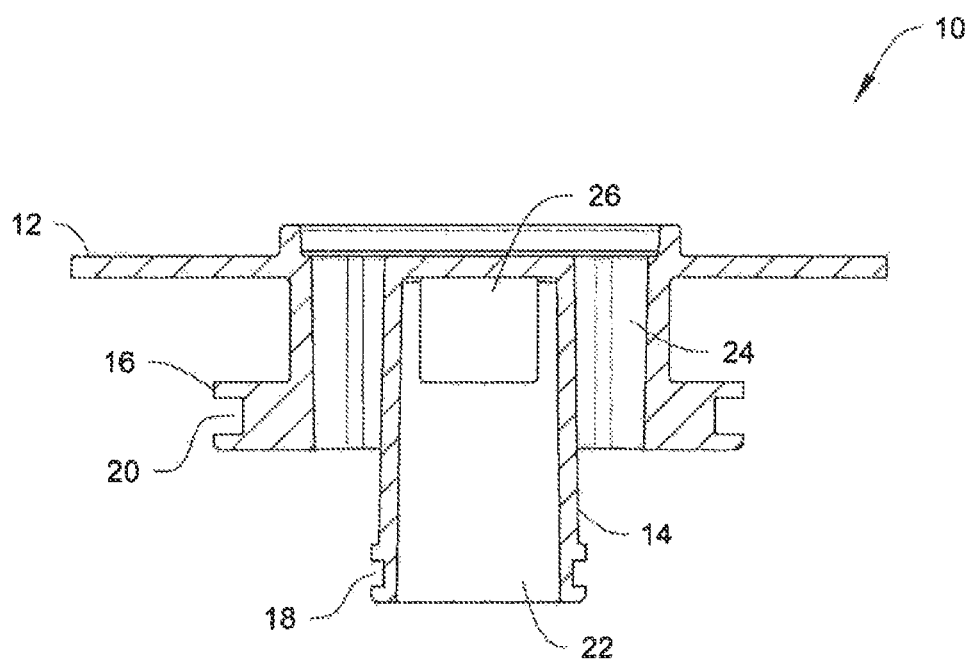
FIG. 4 is a sectional view of the endplate of FIG. 1 taken from A-A of FIG. 2.

In one embodiment, the first flow portion 14 includes at least one side opening 26. FIG. 3 shows two side openings 26, but it will be appreciated that there may be more than two if appropriate. Each side opening 26 is in fluid communication with the channel 22, and directs flow from the channel 22 out of the first flow portion 14 and separator 10. Fluid flow is directed toward the sides or rim of the endplate 12. It will be appreciated that if the side opening(s) 26 and channel 22 are employed as an outlet, then flow would enter the separator 10 from the side and into the first flow portion 14.

The separator 10 may include sealing capability, for example when a cartridge, to which the endplate 12 is connected, connects to a receiving portion of a filtration module. In one embodiment, groove 18 and groove 20 are respectively disposed on the first flow portion 14 and the second flow portion 16. Each of groove 18, 20 may have a seal member disposed in each groove, such as but not limited to an o-ring or gasket type seal member. For example, the seal member in groove 18 seals filtered fluid from non-filtered fluid and the seal member in groove 20 seals from leakage outside a filtration system in which the endplate 12 is employed.

It will also be appreciated that instead of grooves 18, 20, the outer surface or rim of the first flow portion 14 and the second flow portion 16 may be constructed as sealing portions without the need for extra sealing members, such as for example by interference fit or press fit against respective surfaces of a filtration module that receives the first flow portion 14 and second flow portion 16 of the separator 10.

Figure 5:
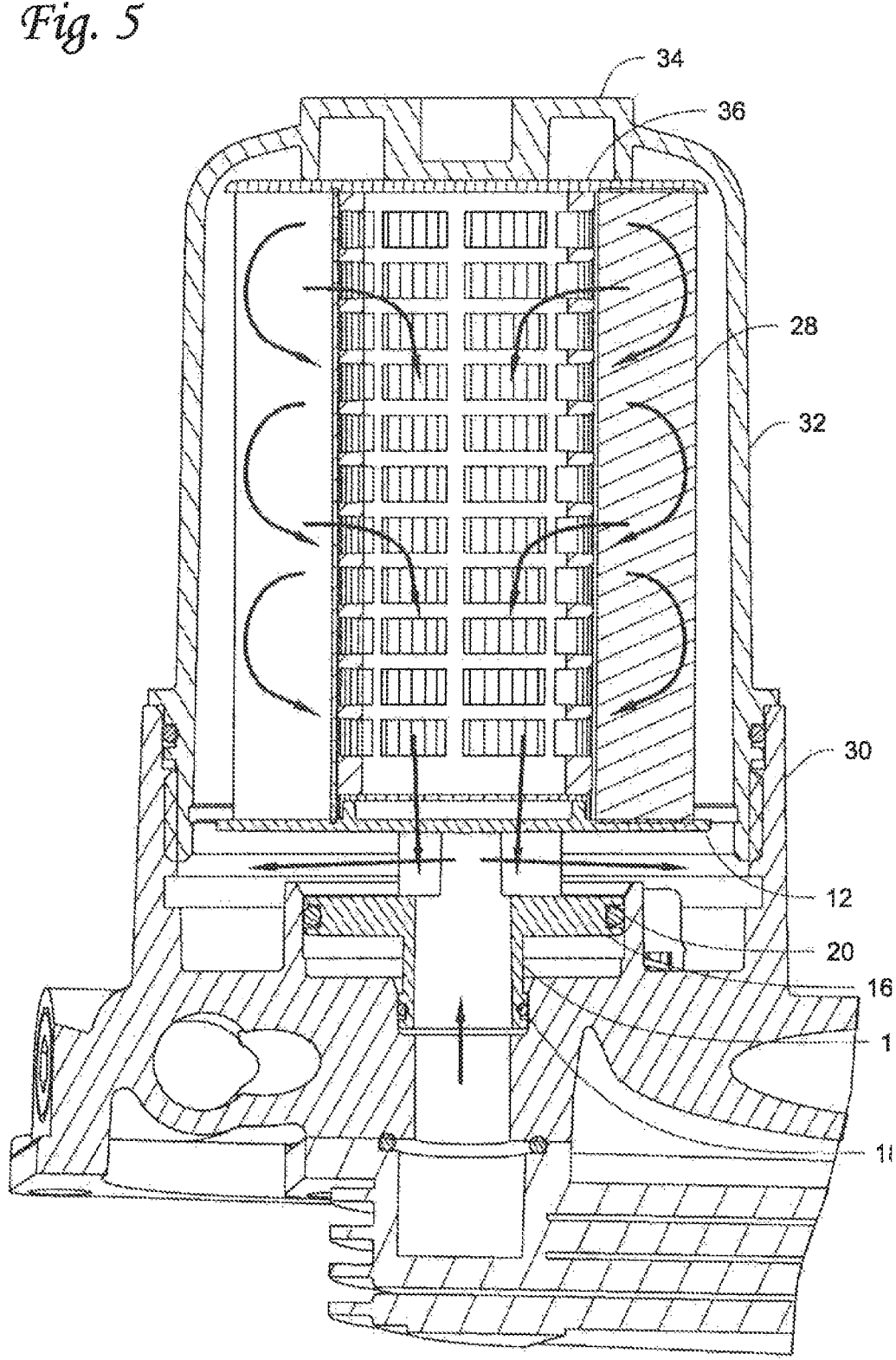
FIG. 5 is a sectional view of the endplate of FIG. 1 shown with a filtration module and assembled as part of a filter cartridge.
Figure 6:
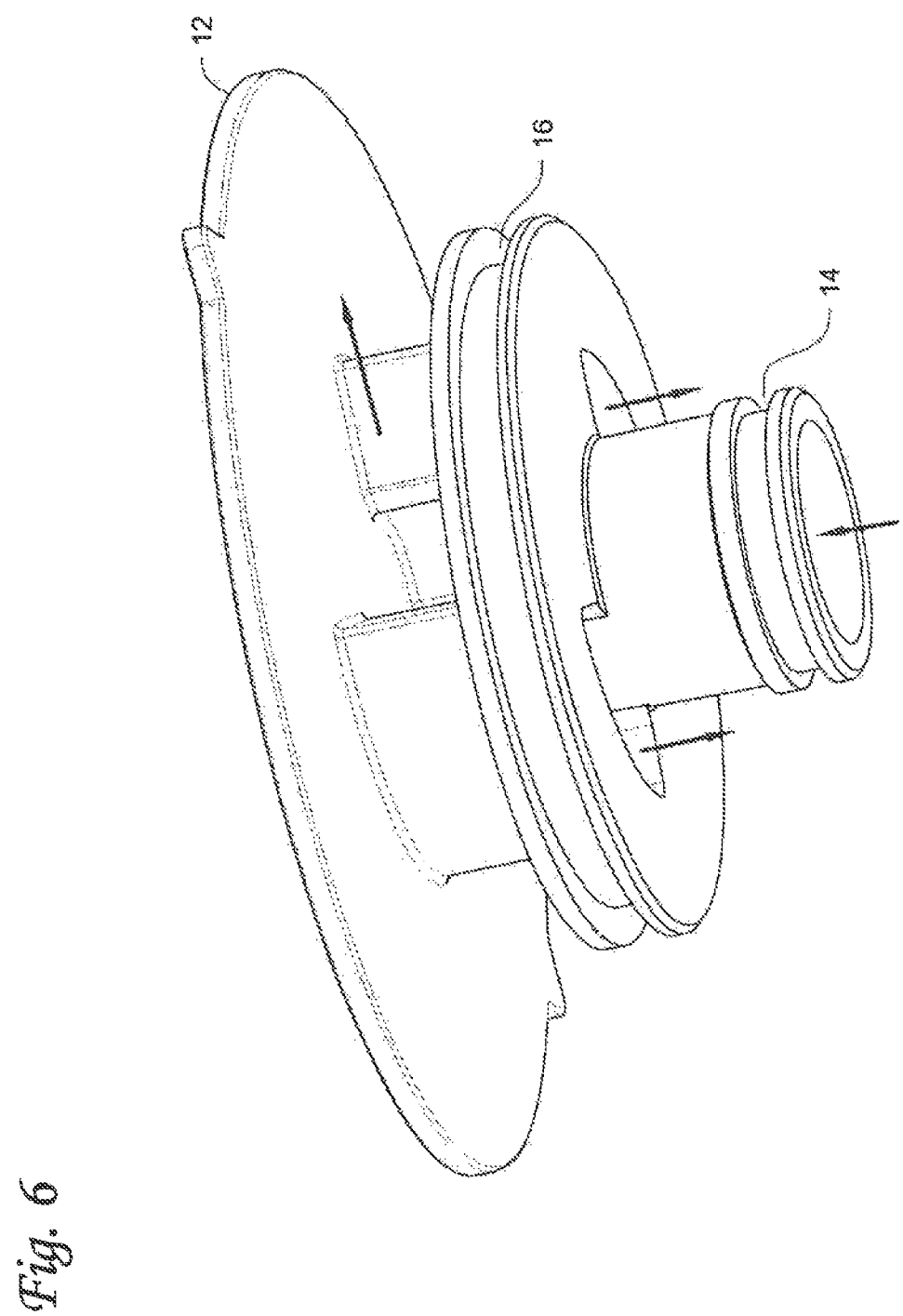
FIG. 6 is another perspective view of the endplate of FIG. 1 showing a fluid flow configuration through the endplate.
Figure 7:
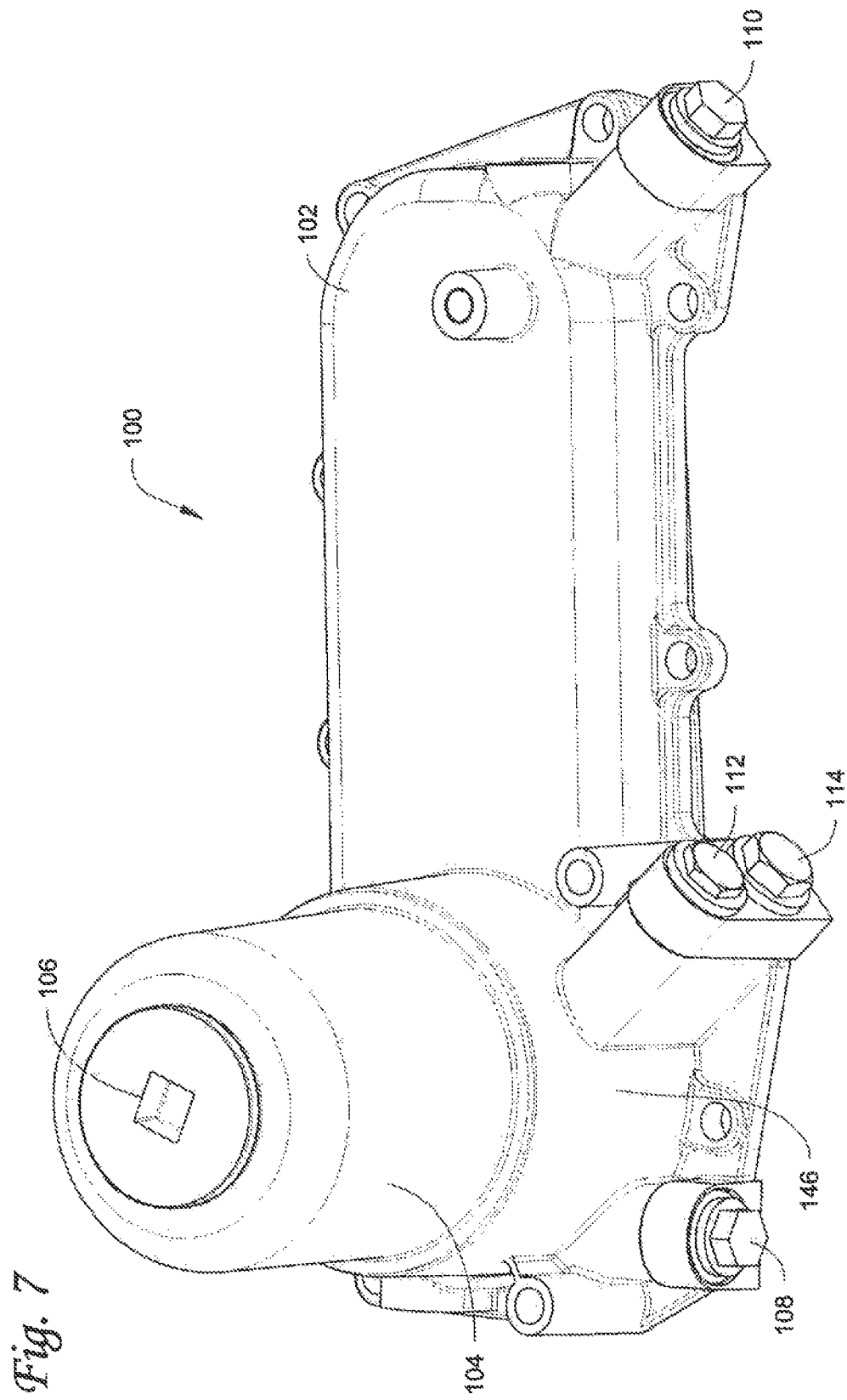
FIG. 7 is a perspective view of one embodiment of a filtration module, for example an oil filter and cooler module.
Figure 8:
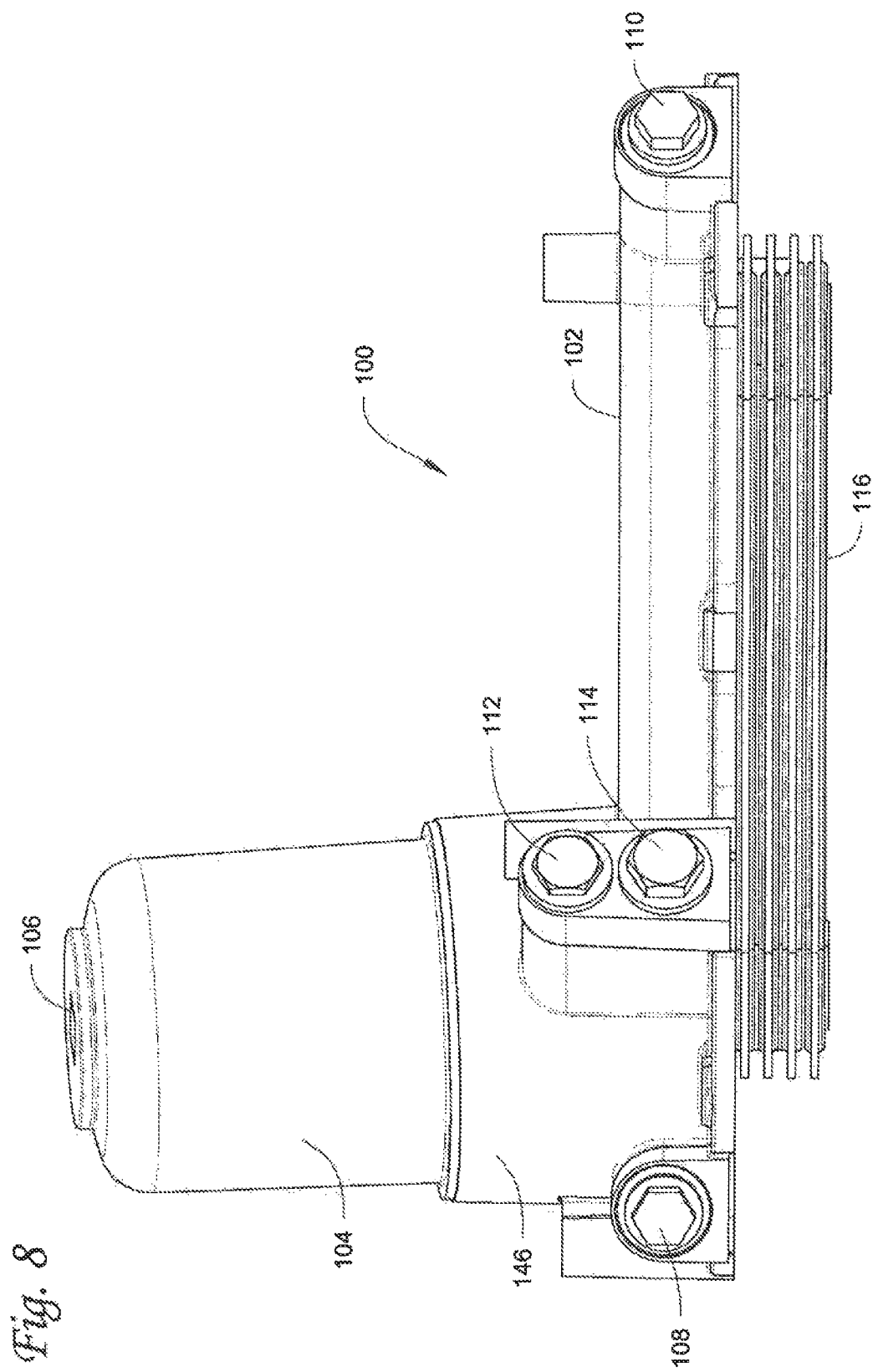
FIG. 8 is a side view of the filtration module of FIG. 7.
Figure 9:
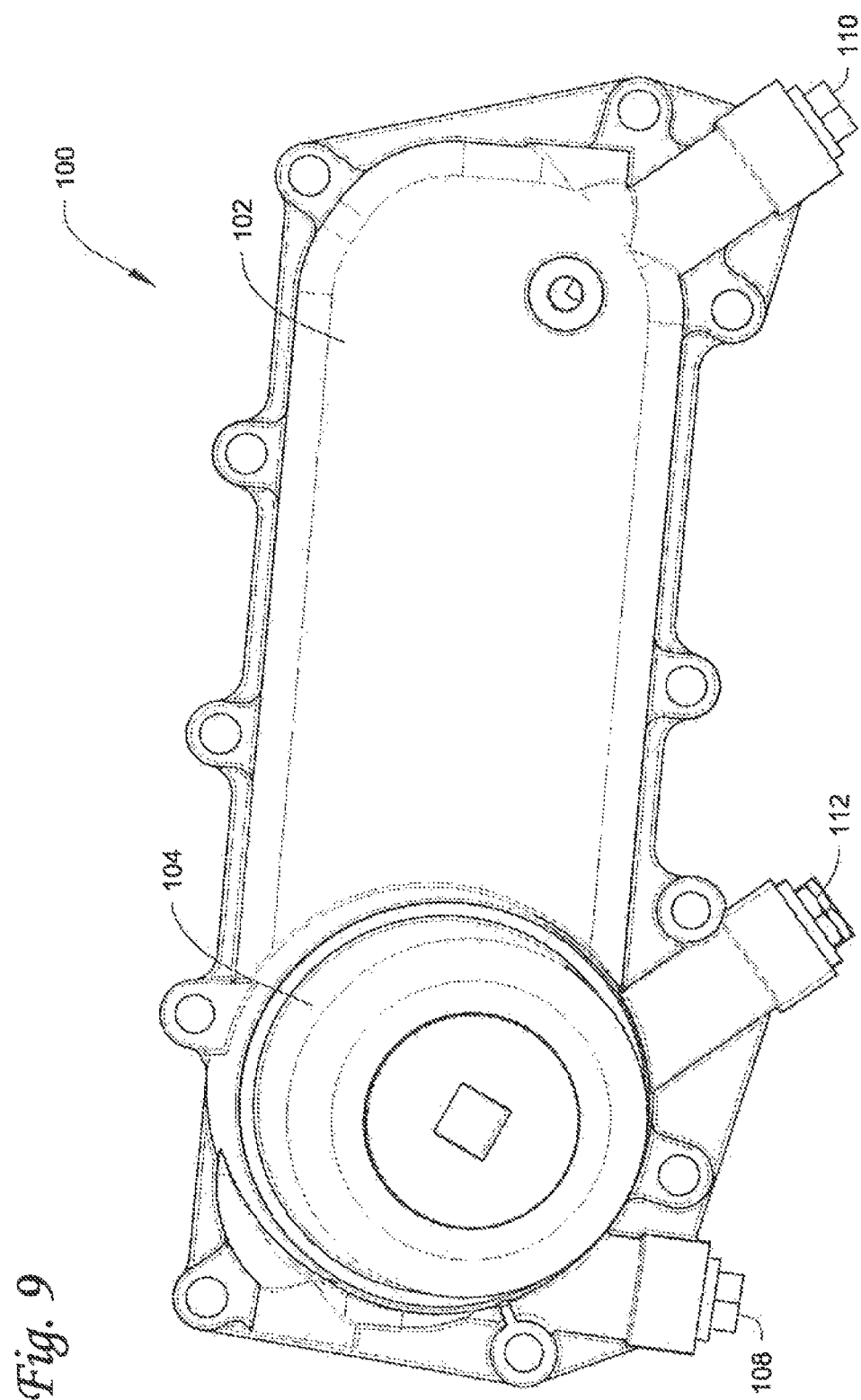
FIG. 9 is a top view of the filtration module of FIG. 7.
Figure 10:
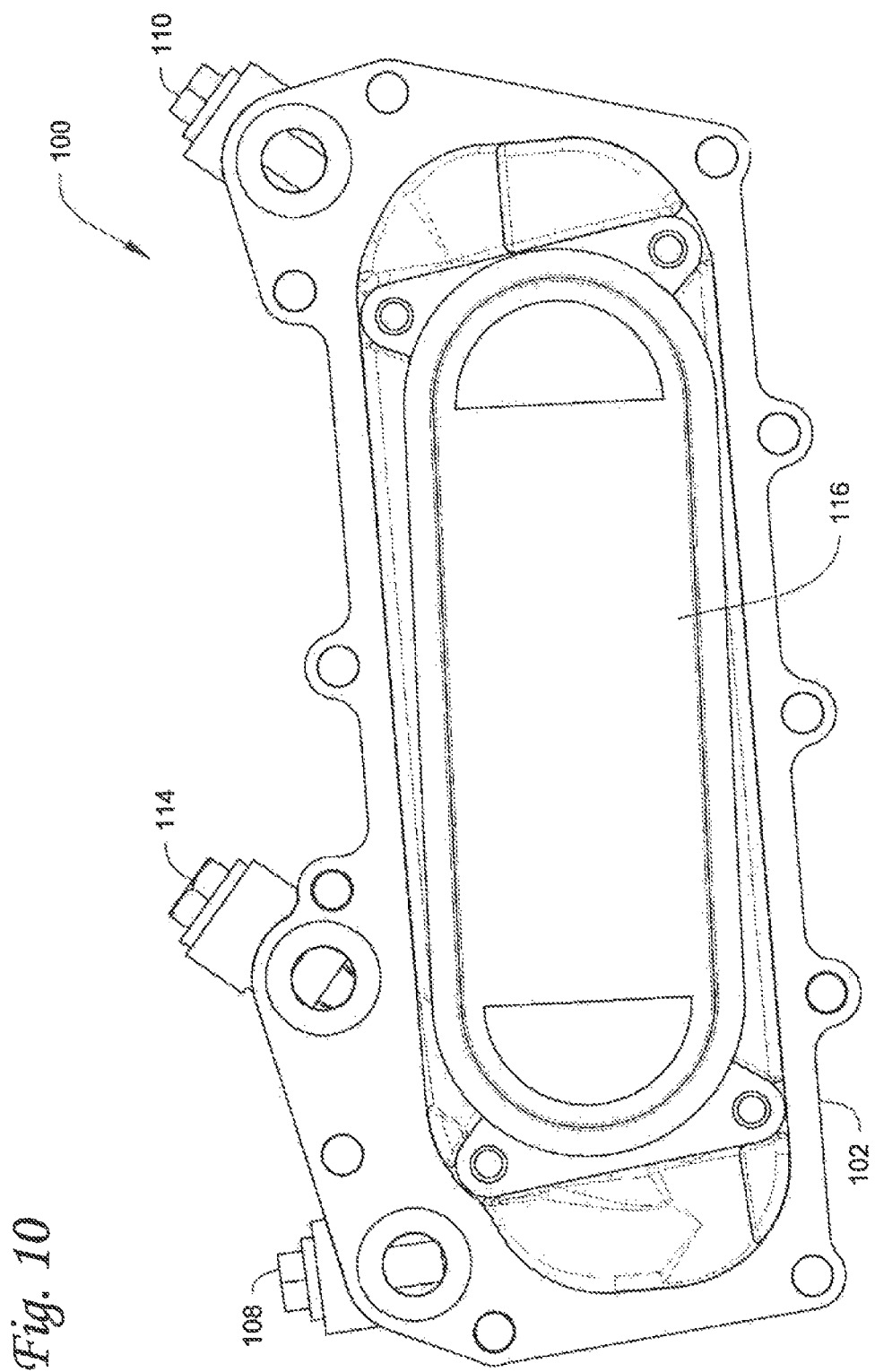
FIG. 10 is a bottom view of the filtration module of FIG. 7.

FIG. 5 shows an embodiment of the endplate 12 and separator 10 assembled as part of a filter cartridge 28. One modification of the endplate 12 shown in FIG. 5 is that an axial flange extends upward at the rim of the endplate 12, which is not shown in FIGS. 1-4. Otherwise, like reference numbers of the separator 10 elements shown in FIGS. 5 and 6 are not further described.

The filter cartridge 28 has a top endplate 36 and the bottom endplate 12 including the separator 10. The filter cartridge 28 has a filter media and can have a center tube around which the filter media is disposed. Such a filter media configuration is well known. As shown in FIG. 5, the filter cartridge 28 may be connected to a shell or housing 32, such as for example by connection of a retention structure on the top endplate 36 to a top portion 34 of the shell 32 that receives the retention structure of the top endplate 36. In some examples, the retention structure can be but it is not limited to an axial flange extending upward from the top endplate 36 with a barb that connects to a catch on the top portion 34 of the shell 32.

The filter cartridge 28 and shell 32 can be connected to a filter head 30 of a filtration module. In the example shown, the filtration module may be but is not limited to an oil filter and cooler module and the filter cartridge 28 may be configured as top load. For example, the filter head 30 has an accommodating structure to receive the shell 32 and filter cartridge 28, as well as the first flow portion 14 and second flow portion 16 of the separator 10. In some embodiments, the shell 32 has a thread on its outer surface that connects with a thread on an inner surface of the filter head 30. A seal member such as an o-ring may be used to seal the outer surface of the shell 32 with the inner surface of the filter head 30.

The retention structure described above can allow for the filter cartridge 28 and shell 32 to be installed together as a single unit and be removed as a single unit from the filter head 30. Such a configuration can allow for an ease of installation and/or servicing.

FIG. 5 and FIG. 6 show the fluid flow configuration through the endplate 12, For example, fluid to be filtered enters the first flow portion 14 and then is directed to the rim of the endplate 12. The fluid then flows to the sides of the filter cartridge 28 where it may be filtered by the filter media (see curved arrows entering the filter media of the filter cartridge). Once inside the center of the filter media, filtered fluid flows to the endplate 12 and through the second flow portion 16 and exits the endplate 12 and separator 10.

FIGS. 7-19 show one embodiment of a filtration module 100 into which a filter cartridge, e.g. 28, including the endplate 12 and its separator 10 may be implemented. In the example shown, the filtration module 100 may be employed, for example as an oil filter and cooler module. For ease of description, the filtration module may be referred to as an oil filter and cooler module. It will be appreciated, however, that the filtration module 100 and its features are not necessarily limited to the filtration and cooling of oil. For example, the filtration module 100 may be employed where fluid filtration and heat exchange principles may be needed and/or desired.

FIGS. 7-10 show various perspective, top, bottom, and side views of the filtration module 100. The filtration module 100 includes a flow body 102, a shell 104, and a cooler component 116. The flow body 102 includes an inlet port 108, an outlet port 110, a service port 112, and a system bypass port 114. Plugs may be used to physically close any of the ports. In some embodiments, the flow body 102 and shell 104 may be constructed of a material such as but not limited to a metal material, for example aluminum.

The shell 104 connects to a head portion 146. The shell 104 and head portion 146 may be similar in construction as the shell 32 and filter head 30 in FIG. 5, and can include an attachment feature 106, such as for example a socket, that allows for connection and/or disconnection of the shell 104 to the head portion 146 of the flow body 102. As with shell 32 and filter head 30, the shell 104 can connect to the head portion 146 of the flow body 102 such as for example through a threaded connection.

The cooler component 116 may be a counter flow oil cooler composed of multiple plates, for example four plates as shown in the Figures. Counter flow oil coolers with similar plate structures are known and not further described.

Figure 11:
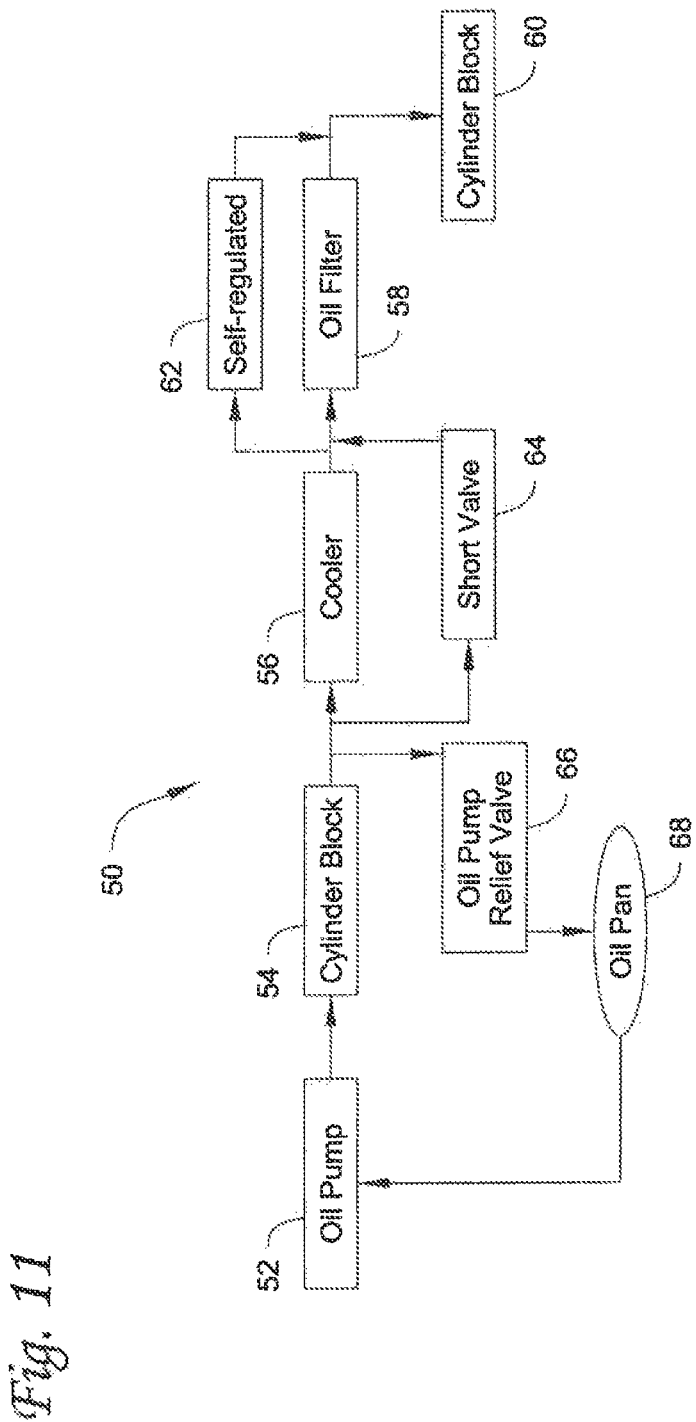
FIG. 11 is a flow diagram of fluid flow through the filtration module of FIG. 7.

FIG. 11 shows a diagram of fluid flow through an oil filtration system that employs as one example the filtration module 100 and with reference to module 100 components shown in FIGS. 7-10. Generally, an oil pump 52 pumps oil to a cylinder block 54. The filtration module 100 allows oil to enter the inlet 108 of the flow body 102 to first be cooled 56 by the cooler component 116. After cooling, the oil may be filtered 58 by a filter cartridge, which is housed by the shell 104 and head portion 146 of the flow body 102. After being filtered, the oil can return to the cylinder block 60.

In some embodiments, if pressure in the system is too high, a pressure relief valve for the system may open to allow oil to exit the filtration module 100 before being cooled 66 and return to the oil pan 68, where it may later be pumped back into the system. For example, system bypass port 114 may allow for release of oil from the filtration module 100 when system pressure is high. Other bypass and self-regulation may be employed within the module 100. For example, FIG. 11 shows oil flow to a short valve 64, such as for example when the cooler 56 is blocked, the oil can then flow through short valve 64. For example, oil may release from the shell 104 and filter head 102 through a part of the service port 112 to the bypass port 114. See also e.g. FIGS. 18 and 19. Self-regulation 62 may be employed to continue to allow flow through the system, for example where internal bypass valves may be used to account for blockage by the cooler component 116 or blockage of the filter media of the filter cartridge. See also e.g. FIGS. 15 and 16.

Figure 12:
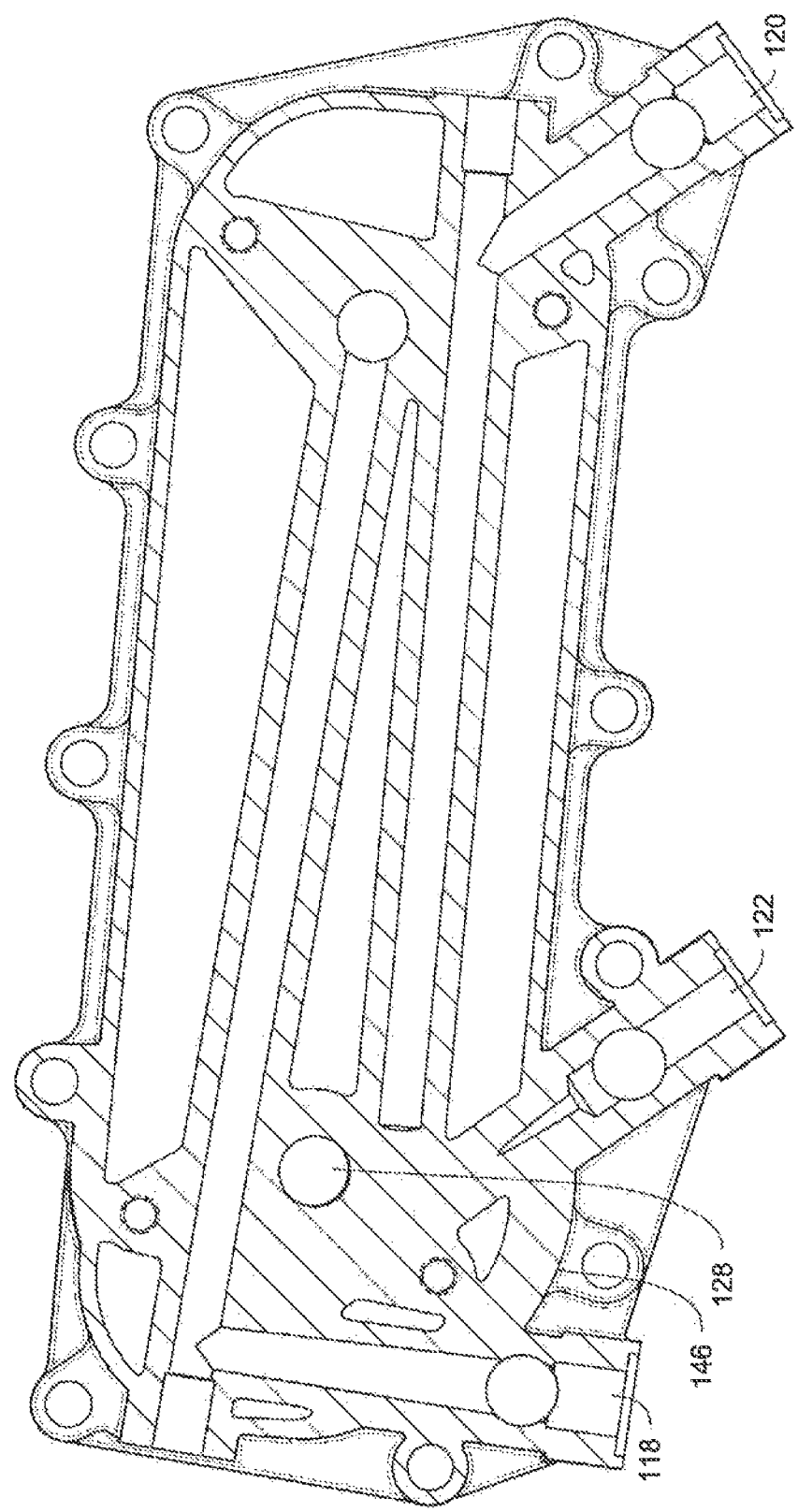
FIG. 12 is a top view of the head portion and flow body of the filtration module of FIG. 7 showing the flow path through the flow body and head.
Figure 13:
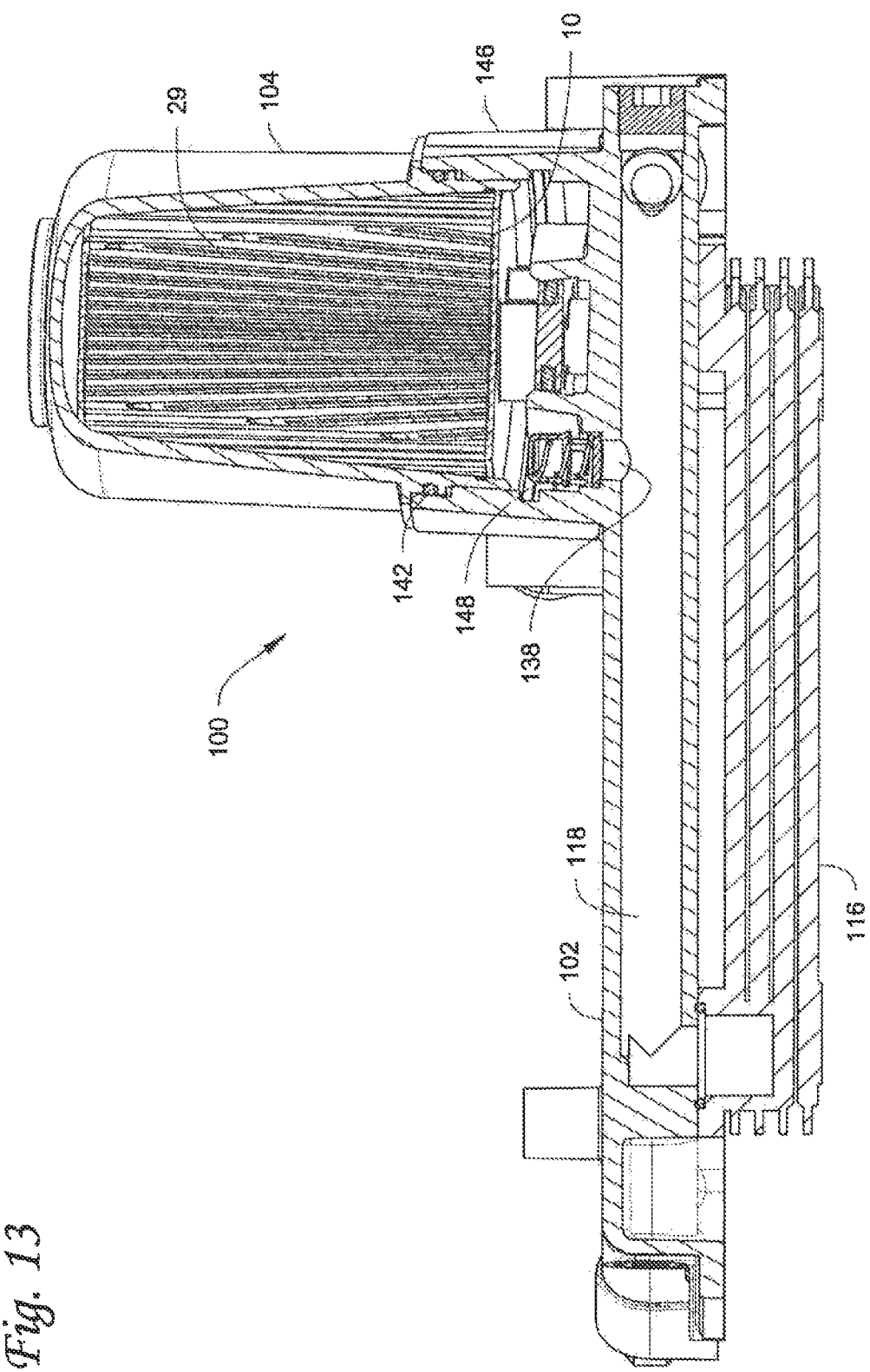
FIG. 13 is a side partial sectional view of the filtration module of FIG. 7.

FIGS. 12-16 also show the flow path through the filtration module 100. In FIG. 12, oil flows into the inlet and proceeds through channel 118 which, with respect to the orientation shown in FIG. 12, extends upward and to the right. The channel 118 allows oil to proceed to the cooler component 116 (under the flow body 102) which, respect to the orientation shown in FIG. 12, would allow flow in the direction going into the page. FIG. 13 shows oil flow from channel 118 through the cooler component 116.

Figure 14:
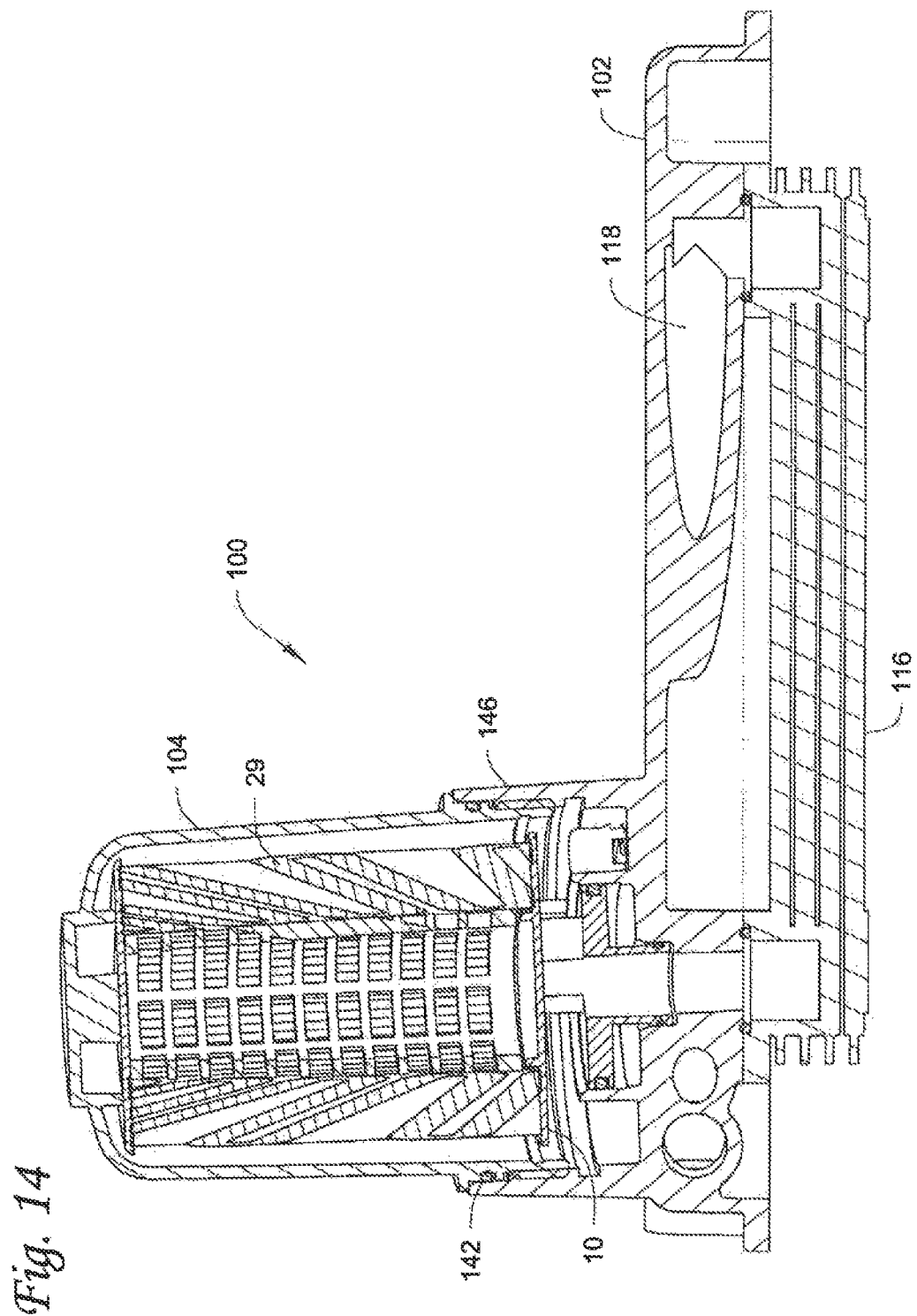
FIG. 14 is another side partial sectional view of the filtration module of FIG. 7.

With reference to FIG. 14 and with reference back to FIG. 12, oil flows through the cooler component 116 and back to the head portion of the flow body 102, so that the cooled oil can be filtered by the filter media for example of the filter cartridge 29. As shown in FIGS. 13 and 14, the separator 10 of the endplate 12 is connected to the filter cartridge 29. The filter cartridge 29 can be similar to the filter cartridge 28, except that the filter cartridge 29 does not include the retention structure at the top endplate. It will be appreciated that the filter cartridge 28 may also be employed in filtration module 100.

The separator 10 allows oil to flow into the shell 104 and head portion 146, which is sealed by a seal member 142. Oil flows through inlet 128 to access the filtration area (see FIG. 12). Similar to FIG. 5, the separator 10, with its first and second flow portions 14, 16 and seals can engage the head portion 146 of the flow body 102, while the shell 104 connects with the head portion 146 of the flow body 102.

With further reference to FIG. 12, filtered oil may exit through outlet 130 into channel 120 and out of the flow body 102. The filtration module 100 also includes a service drain channel 122 and a system bypass channel 124. The service drain channel 122 is in fluid communication with an opening of the head portion 146, so as to allow for oil to be drained for example from the filtration area of the shell 104, filter cartridge 29, and head portion 146. The system bypass channel 124 may be in fluid communication with the channel 118 of the inlet 108, and may open when system pressure is too high.

The filtration module 100 also includes bypass passages 138, 140 to and from the filtration area of the shell 102 and head portion 146. Bypass passage 138 can allow bypassing of the cooler so that oil can flow into the filtration area of the head portion 146 and shell 104 and to the filter cartridge 29. This may occur for example, if the cooler component 116 is blocked. Bypass passage 140 can allow bypassing of the filter cartridge, so that oil can flow to the channel 120. This may occur for example, if the filter media of the filter cartridge is blocked.

Figure 15:
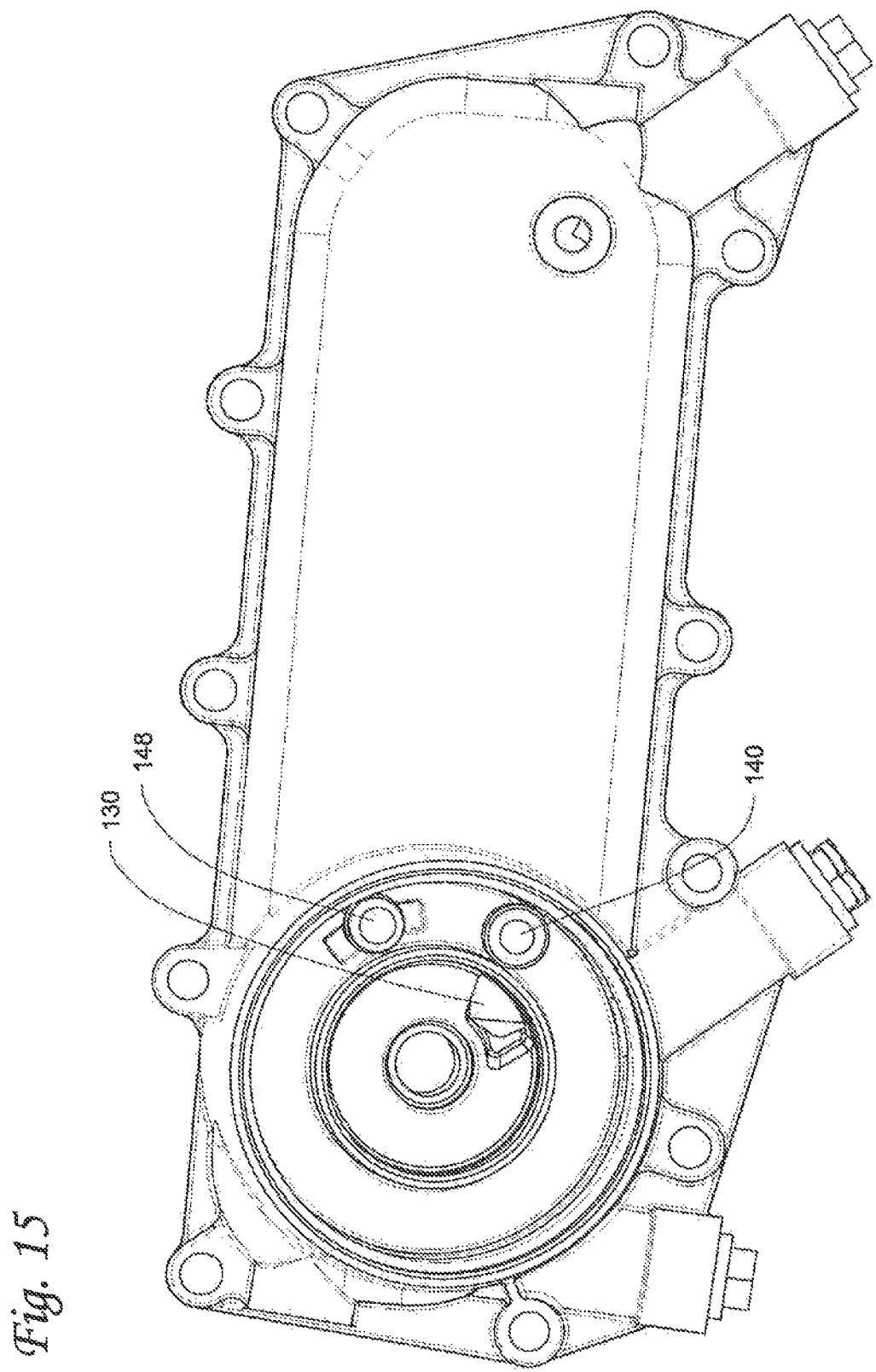
FIG. 15 is a top view of the head portion and flow body of the filtration module of FIG. 7 showing internal bypass valves of the filtration module.
Figure 16:
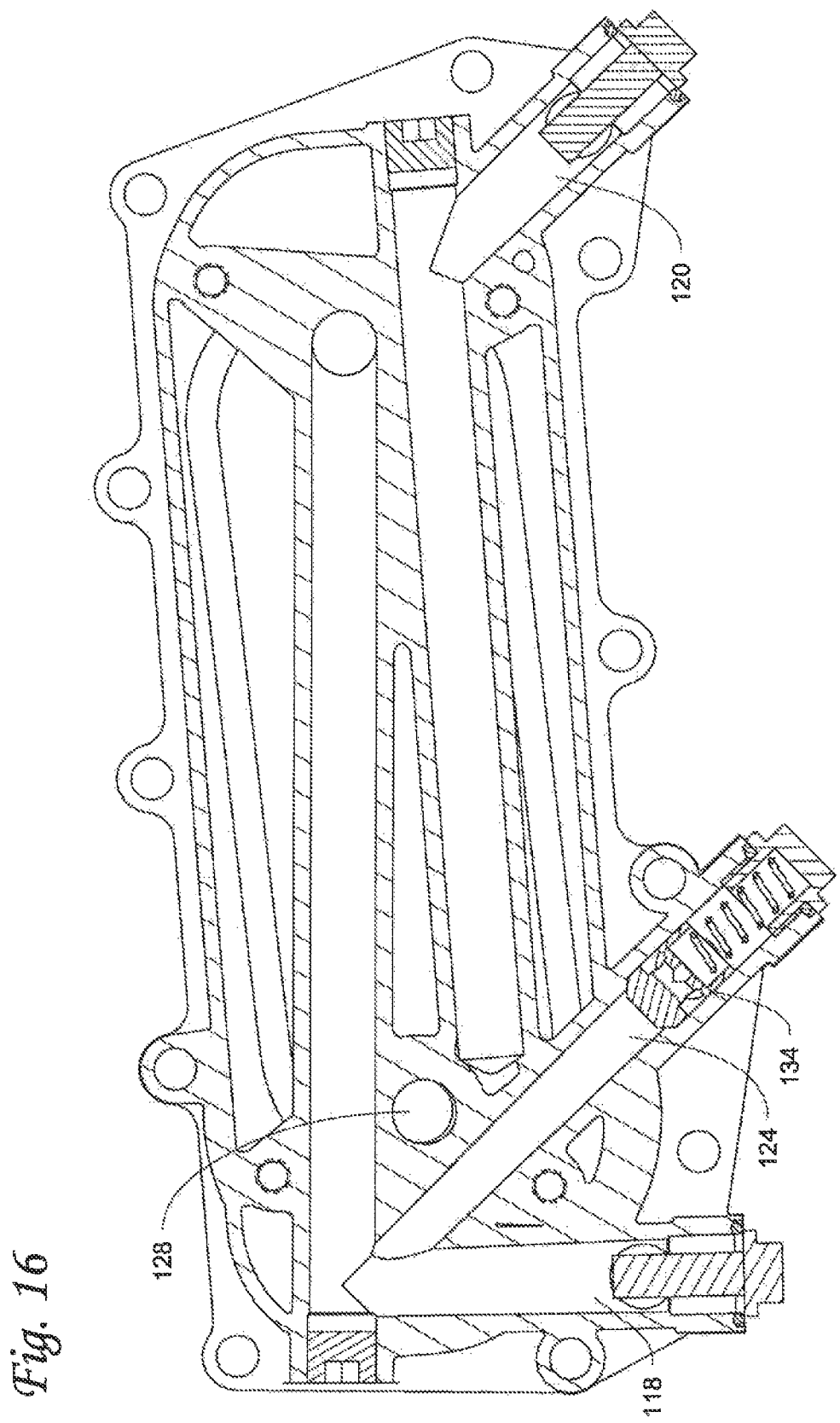
FIG. 16 is another top view of the flow body of the filtration module of FIG. 7 showing the flow path and a system bypass path of the filtration module.

With further reference to FIG. 13, a bypass valve 148 may be disposed over the bypass passage 138. In one example, the valve 148 of the bypass passage 138 can be pressure regulated such that when pressure in channel 118 is high enough (e.g. if the cooler component 116 is blocked), then the valve 148 will open allowing oil to flow through the bypass passage 138. FIG. 15 also shows the bypass valve 148 over where the bypass passage 138 is positioned. A bypass valve 150 may also be similarly disposed where bypass passage 140 is positioned (see e.g. FIG. 17). FIG. 16 shows a bypass valve 134 at the system bypass channel 124 and port 114.

FIG. 17 shows the filtration module 100 in one example of an exploded configuration. As shown, the filtration module 100 includes the flow body 102 with a head portion 146. The head portion 146 receives the shell 104 and filter cartridge 29, which includes the endplate with the separator 10. The shell 104 can have threads 144 and be connected to threads of the head portion 146. The shell 104 is sealed to the head portion 146 by the seal member 142 when they are connected. The separator 10 on the endplate of the cartridge 29 can be received by the flow body 102 at the head portion 146, such that the first flow portion 14 and second flow portion 16 of the separator 10 can be in fluid communication with the inlet 128 and outlet 130 of the flow body 102. In this view, some of the channels are shown, e.g. channels 118, 120. The cooler component 116 is connected underneath the flow body 102, Valves 148, 150 are shown in FIG. 17. Valve 148 is for the bypass passage 138 and valve 150 is for the bypass passage 140. As with valve 148, valve 150 may also be but is not limited to a pressure regulated valve.

Figure 19:
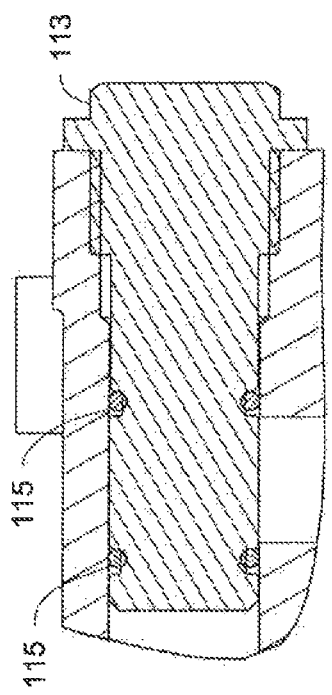
FIG. 19 is a side partial sectional view of the drain port and plug of FIG. 18.
Figure 18:
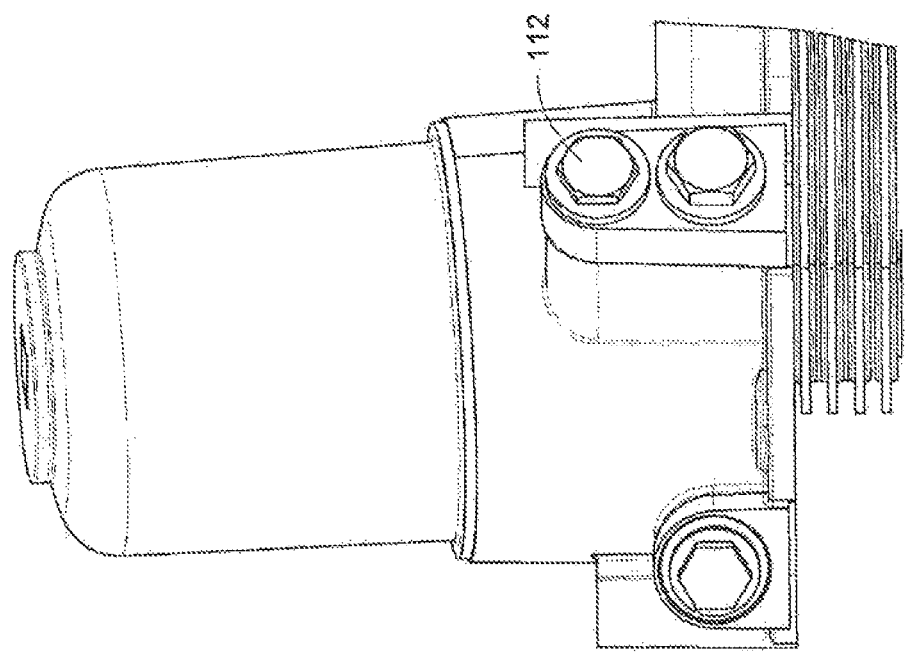
FIG. 18 is a partial perspective view of the filtration module of FIG. 7 showing one embodiment of drain port and plug.
Figure 20:
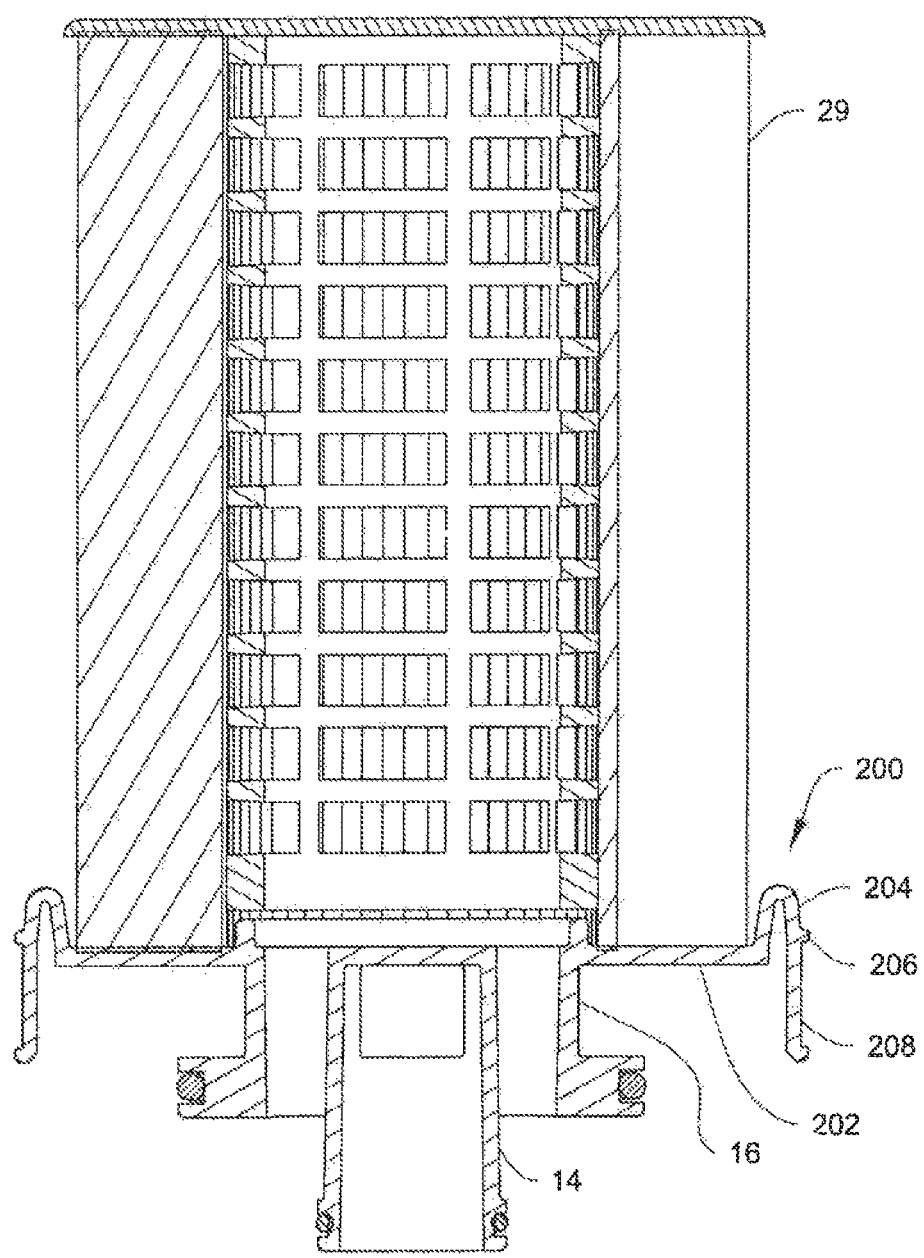
FIG. 20 is a sectional view of another embodiment of a filter cartridge endplate.

FIGS. 18 and 19 show the drain port 112 up close and show one embodiment of a drain plug 113. The drain port 112 and drain plug 113 can help to make servicing more easy and clean. For example, during maintenance, replacement of a filter cartridge, and/or installation of a filter cartridge, the drain plug 113 can be removed, such as by unscrewing the drain plug 113 from the drain port 112. Partial removal of the drain plug 113 and release of its seals 115, e.g. o-ring seals, can allow used oil to drain from the filtration module 100, for example through the bypass port 114 of bypass channel 124. Full removal of the drain plug 113 can allow for drainage through the drain port 112. However, in some instances, it may be desired to not fully remove the drain plug 113, as this might cause dirty oil to leave the filter which in some cases is to be avoided.

FIGS. 20-24 show another embodiment of a separator 200 for a filter cartridge endplate 202. The separator 200 can be configured similarly as separator 10 of endplate 12, and can include the flow structure of first flow portion 14 and second flow portion 16. And the endplate 202 with its separator 200 can be connected as part of a filter cartridge, e.g. filter cartridge 28, 29.

One main difference is with the endplate 202, which as a retention structure. For example, the endplate 202 in one embodiment has a retention flange 204 with a barb 206. The retention flange 204 and barb 206 can engage a catch 105 formed on an inner surface of the shell 104. The retention flange 204 and barb 206 retain the filter cartridge 29 within the shell 104.

Figure 22:
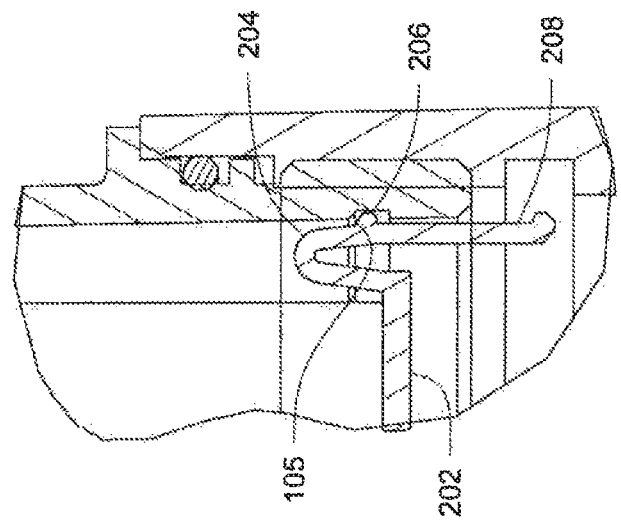
FIG. 22 is a close-up sectional view of one embodiment of a retention structure of the endplate.
Figure 21:
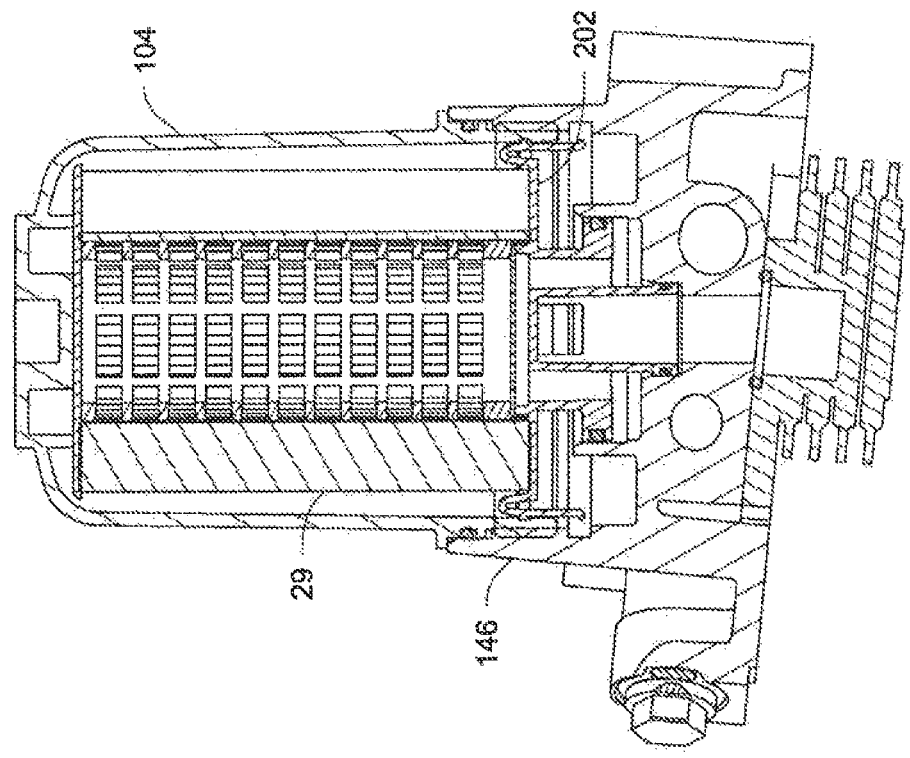
FIG. 21 is another sectional view of the endplate of FIG. 20 shown connected to a filtration module.

FIG. 21 shows the shell 104 with the cartridge 29 retained therein connected to the head portion 146 of the filtration module 100. FIG. 22 is a close-up sectional view showing the barb 206 and retention flange 204 engaged with the catch 105 and inner surface of the shell 104. As shown, two retention flanges 204 and each with a respective barb 206 may be employed on the endplate 202.

In one embodiment, each retention flange 204 also includes a release bar 208. The release bar 208 allows for the filter cartridge 29, to which the endplate 202 is connected, to be released from the shell 104 and removed therefrom and allows for connection to the shell. In one embodiment, the release bar 208 is biased, such that by pressing it inward against its biased direction and toward the endplate 202, the barb 206 can be released from the catch 105 of the shell and allows removal of the filter cartridge 29 from the shell 104.

Figure 23:
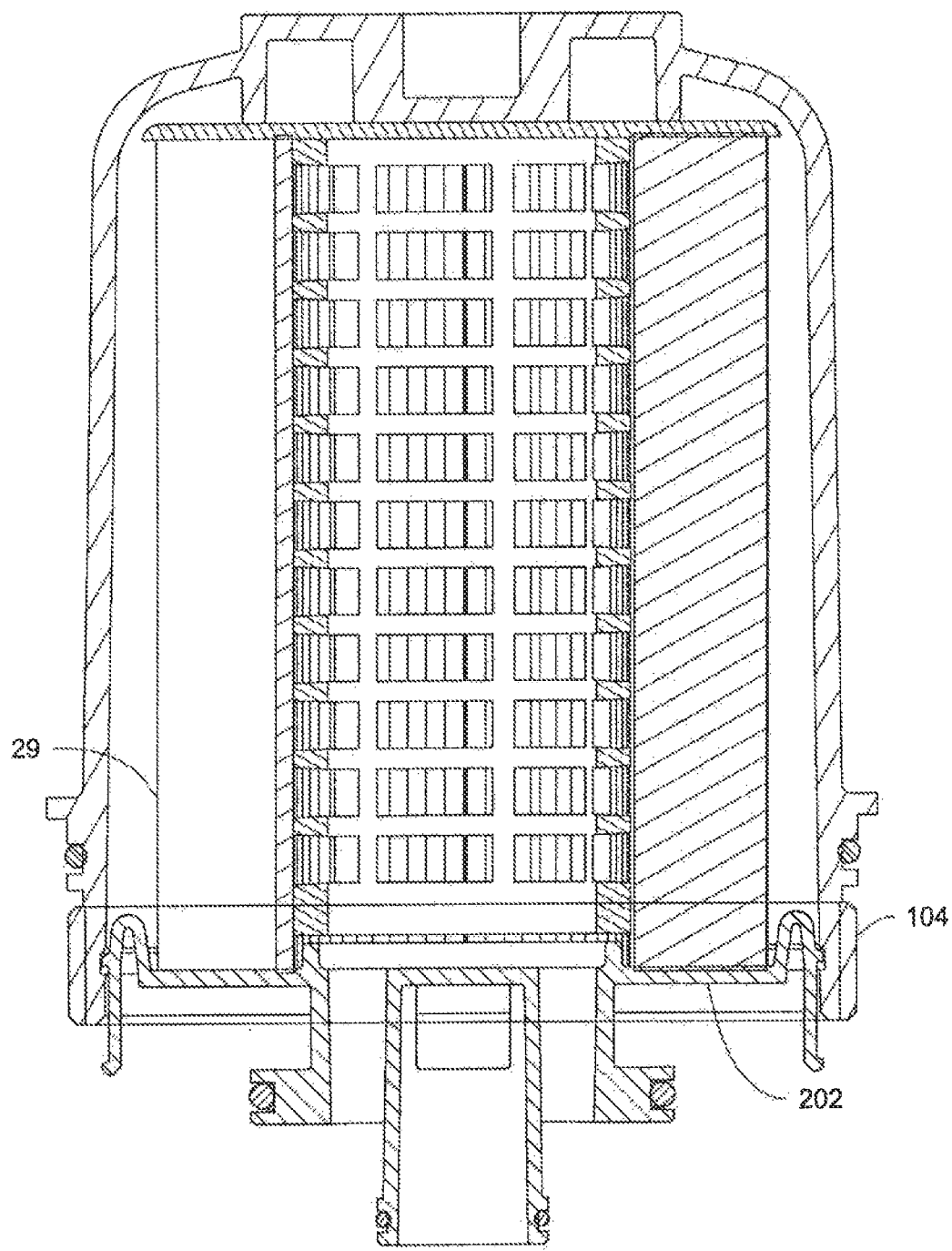
FIG. 23 is another side section view of the endplate of FIG. 20 shown connected to a housing for a filtration module.

FIGS. 23 and 24 show the filter cartridge 29 retained within the shell 104 as a single unit that can be removed from the flow body of the filtration module for servicing and/or maintenance. For example, when the shell 104 is removed from the head portion 146 of the flow body 102, such as by un-screwing, the filter cartridge 29 and shell 104 are removed together. Once removed, the barb 206 can then be released by pressing the release bar 208, and the filter cartridge 29 removed. Likewise, the filter cartridge 29 could be installed in the shell by pressing the release bar 208 to allow the barb to be positioned into the catch 105 of the shell 104, Releasing pressure from the release bar 208 allows it to return to its biased position, which allows the barb 206 to engage the catch 105. Then the filter cartridge 29 and the shell 104 can be installed together onto the head portion 146 of the flow body 102. The shell 104 can have threads at 107 which would be connectable with threads on the head portion 146. Seal 242 similar to seal 142 may be employed to maintain a seal between the shell 104 and the head portion 146.

In another example, the integrated flow structure can be employed to separate fluids that exit the filter cartridge, rather than to separate incoming and outgoing fluids. FIGS. 25-28 show embodiments of a separator 300, 500 that may be used for both exit of filtered fluid and exit or drainage of a separated fluid.

FIGS. 25-28 show embodiments of an integrated flow structure built within an endplate. The integrated flow structure includes a separator that can generally be constructed to resemble a spud that protrudes axially away from a major surface of the endplate. In the embodiments shown, the separator is disposed about a center of the endplate. In one example, the separator extends axially from and may be centered along a center line through the endplate.

Figure 26:
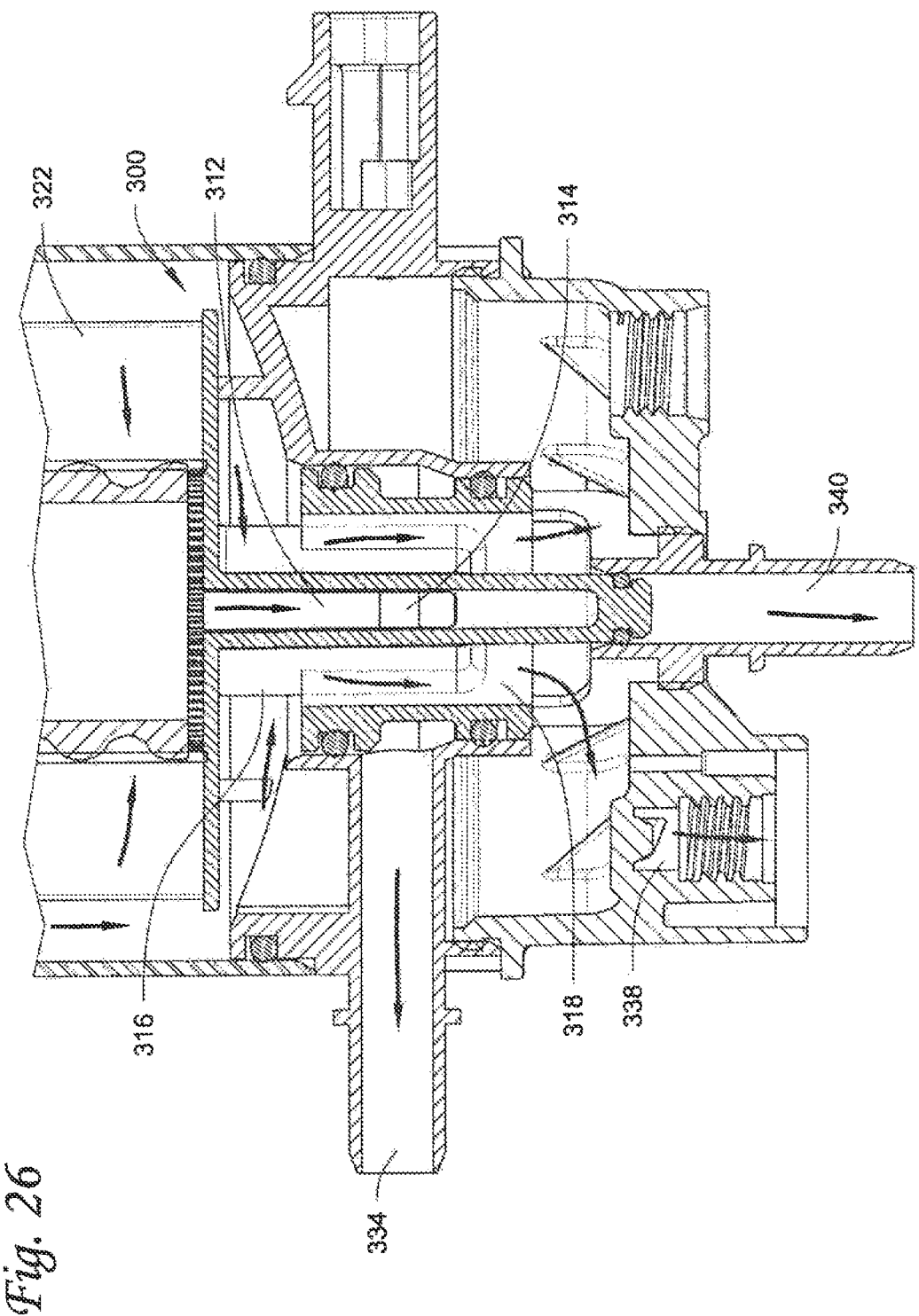
FIG. 26 is another sectional view of the endplate of FIG. 25 shown connected as part of a filter cartridge and connected to a filtration module, and showing a fluid flow configuration through the endplate.

FIG. 25 shows one embodiment of a separator 300 on an endplate 302. The endplate 302 is connected as part of a filter cartridge that has filter media 322 and a center tube 324. It will be appreciated that the filter cartridge, while partially shown, may be constructed and configured as any of filter cartridge 28, 29 or differently than those described above. In one embodiment, the filter cartridge can be a top load type filter cartridge, such as for example in fuel water separator of a fuel filtration system. FIG. 26 shows the filter cartridge connected to endplate 302 and the separator 300 and also connected to a filtration module. FIG. 26 shows a fluid flow configuration through the separator 300 and endplate 302.

The separator 300 includes a first flow portion 304 connected to a second flow portion 306. In one embodiment, the first flow portion 304 may be an outlet for filtered fluid to exit the filter cartridge and the endplate 302. In one embodiment, the second flow portion 306 may be an outlet for fluid drained from the filter cartridge. For ease of description, the first flow portion 304 and second flow portion 306 both are described as outlets for exiting fluid.

However it will be appreciated that either of the first flow portion 304 or second flow portion 306 may be employed as an inlet for fluid, such as for example fluid to be filtered as in the separators e.g. 10, 200.

As one example, the separator 300 and endplate 302 may be employed in a fuel filter cartridge, for example a fuel water separator, such that the separator 300 is used to exit filtered fuel and exit drained water that has been separated from the fuel by the filter cartridge. It will be appreciated that the separator 300 and endplate are not limited to use in fuel water separators, as other filtration applications may employ the structure of the separator 300 and endplate 302.

As shown, the first flow portion 304 is disposed radially inward relative to the second flow portion 306. The first flow portion 304 has an outlet formed by channel 312 and the second flow portion 306 has an outlet formed by channel 318. Jr. one embodiment, the first flow portion 304 and second flow portion 306 are concentrically arranged. For example, filtered fluid such as for example fuel, can exit through the endplate 302 and through the outlet available through the channel 312, and drained fluid such as for example water, can enter the separator 300 of the endplate structure through the outlet available through channel 318.

In one example, the channels 312, 318 allow for axial flow to and from the endplate 302, and are disposed toward the center of the endplate 302.

In one embodiment, the channel 312 includes a side opening 314 which is in fluid communication with the channel 312. The side opening 314 allows filtered fluid to exit the separator 300 and endplate 302.

In one embodiment, there are two channels 318. In one embodiment, the second flow portion 306 includes at least one side opening 316, such as a side opening for each channel 318. Two side openings 316 are shown, but it will be appreciated that there may be more than two if appropriate, for example if there are more than two channels 318. The side opening 316 is in fluid communication with its respective channel 318, and directs flow into the side of the second flow portion 306 and into the channel 318. Fluid flow is directed from the sides of the filter cartridge and/or rim of the endplate 302 into the second flow portion 306. It will be appreciated that if the side opening(s) 316 and channel 318 are employed as an inlet, then flow would enter channel 318 of the separator 10 and flow out from the side opening 316 toward the sides of the filter cartridge and/or rim of the endplate 302.

The separator 300 may include sealing capability, for example when a cartridge, to which the endplate 302 is connected, connects to a receiving portion of a filtration module. In one embodiment, groove 308 and groove 310 are respectively disposed on the second flow portion 306, Each of groove 308, 310 may have a seal member disposed in each groove, such as but not limited to an o-ring or gasket type seal member. For example, the seal members in grooves 308, 310 seals filtered fluid exiting the side opening 314 from drained fluid that exits the channel 318 and operating drain 338 of the filtration module. See FIG. 26. In some embodiments, the first flow portion 304 includes a plug 320 with a groove 330 for a sealing member to be disposed therein. The plug 320 can plug a service drain 340 of a filtration module such as during engine operation and when the filter cartridge is installed. When the filter cartridge is removed, the plug 320 is removed and the seal released, so that fluid that may remain in the filtration module can be drained and the filter cartridge can be serviced and/or replaced.

It will also be appreciated that instead of grooves 308, 310, and 330, the outer surface or rim of the first flow portion 304 and the second flow portion 306 may be constructed as sealing portions without the need for extra sealing members, such as for example by interference fit or press fit against respective surfaces of a filtration module that receives the separator 300.

With further reference to FIG. 26, the fluid flow configuration can be such that drained fluid, e.g. water that has separated from fuel enters the side opening 316 of the second flow portion 306 and flows through channel 318 and out of the separator 300 and endplate 302 through operative drain 338. Filtered fluid such as for example fuel exits through the endplate 302 after being filter by filter media 322 and flows through channel 312 and exits through side opening 314 to an outlet 334 of a filtration module, such as a fuel filter housing. The plug 320 plugs service drain 340 until the filter cartridge is removed.

Figure 27:
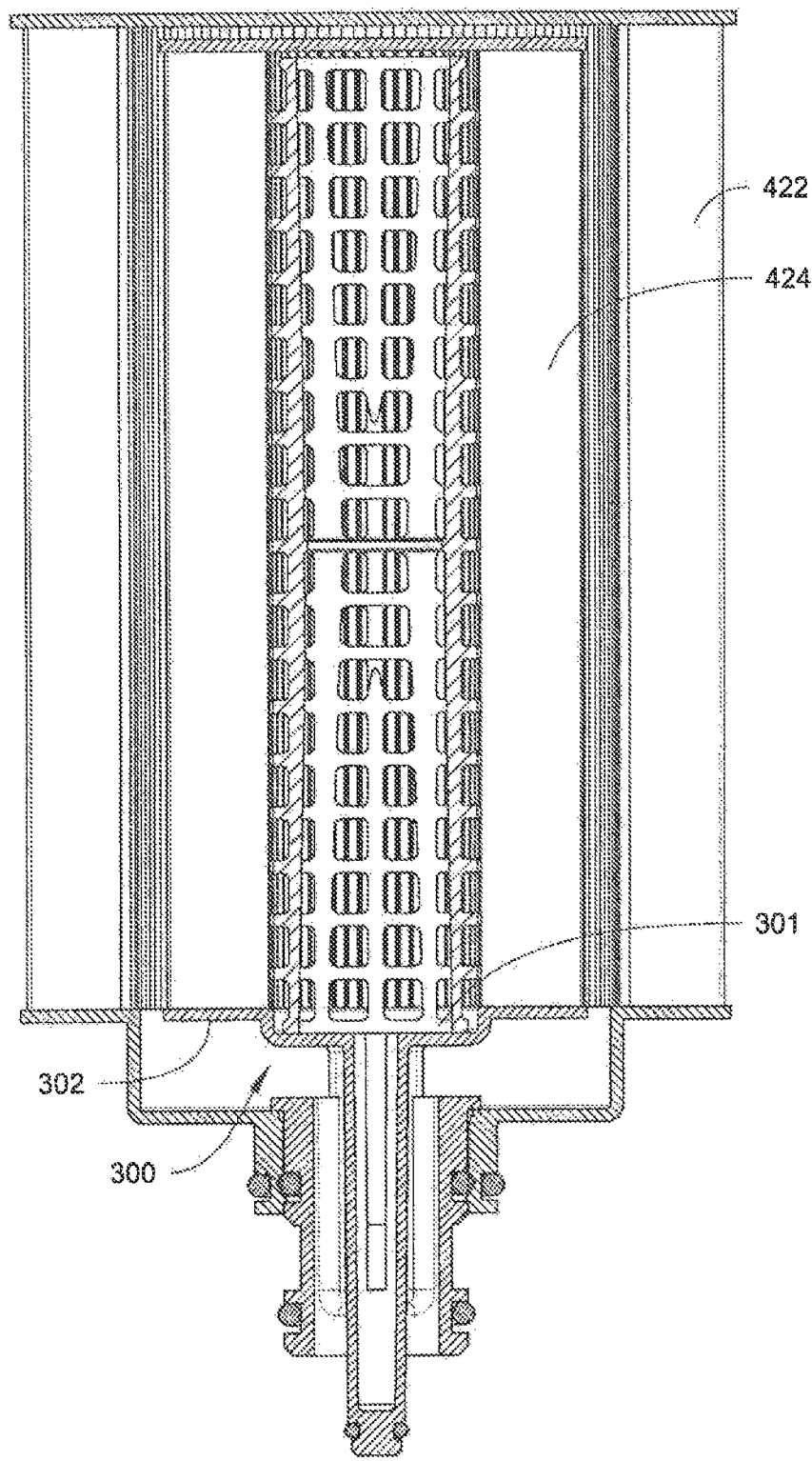
FIG. 27 is a side sectional view of another embodiment of filter cartridge employing the endplate of FIG. 25 with a slight variation.

FIG. 27 shows a slight variation of the separator 300 and endplate 302 connected as part of a dual stage (or filter in filter) filter cartridge having a first stage media 422 and a second stage media 424. The fluid flow configuration is similar to that of the filter cartridge of FIGS. 25-26, where the flow characteristics of the separator 300 are employed, for example after a fluid to be filtered passes through the first stage 422. The slight variation of the separator 300 and endplate 302 is that a recess 301 is included which accommodates the center tube of the second media stage 424.

Figure 28:
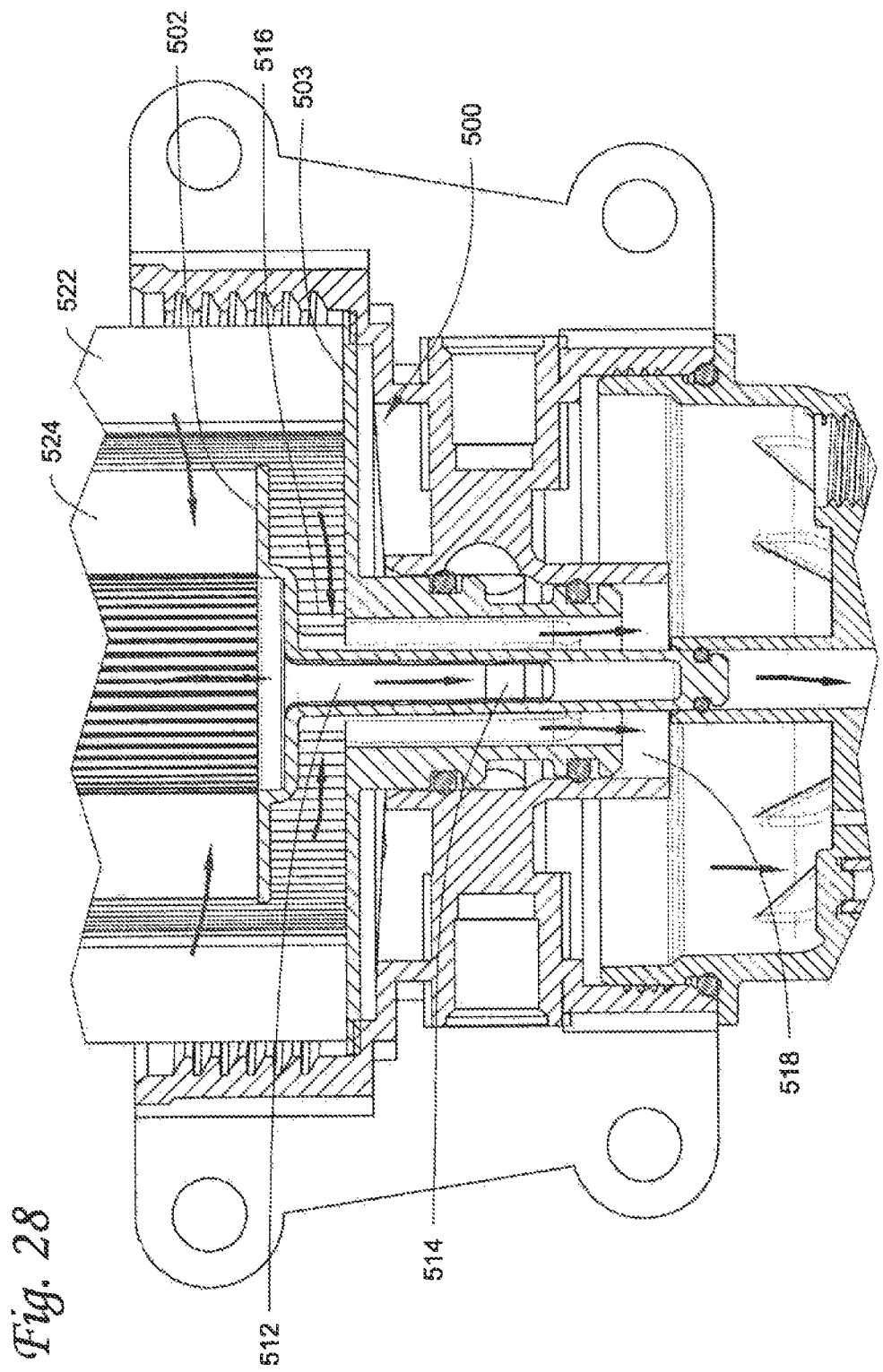
FIG. 28 is a sectional view of another embodiment of a filter cartridge endplate shown connected as part of a filter cartridge and connected to a filtration module, and showing a fluid flow configuration through the endplate.

FIG. 28 is a sectional view of another embodiment of a separator 500 for a filter cartridge endplate. The separator 500 and endplate are shown connected as part of a filter cartridge and connected to a filtration module. FIG. 28 also shows a fluid flow configuration through the endplate and separator 500. Similar to FIG. 27, the filter cartridge is another example of a dual stage (or filter in filter) type filter cartridge, with first media stage 522 and second media stage 524. The difference from FIG. 27 is that the media stage 524 is shorter than media stage 522. To accommodate the different sized filter media of the cartridge, the endplate structure is modified as a dual plate 502, 503 structure connected respectively at the end of each media 522, 524, Between plates 502, 503, a side opening 516 is in fluid communication with channel 518, which can allow for fluid such as water separated from fuel to drain out of the filter cartridge, separator 500 and endplate structure. Filtered fluid can exit through both plates 502, 503 into channel 512 and out the side opening 514. The fluid flow configuration is similar to that of FIG. 27 but for the variation of the endplate structure (two plates 502, 503) to accommodate the different height (or lengths) of the media stages 522, 524.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge endplate structure with an integrated flow structure, comprising:
   a plate with a major surface;
   a retention mechanism comprising:
   a retention flange extending from an outer rim of the plate, and a barb protruding radially from the retention flange, the barb configured to engage a catch provided in a shell so as to retain:
the plate, and
a filter cartridge coupled to the filter cartridge endplate structure within the shell; and
a separator that protrudes axially away from the major surface of the plate, the separator including a first flow portion and a second flow portion, the first flow portion disposed radially inward relative to the second flow portion, the first and second flow portions concentrically arranged relative to the plate and disposed toward a center of the major surface of the plate.

2. The filter cartridge endplate structure of claim 1, wherein the retention flange comprises a release bar extending axially from the retention flange away from the major surface of the plate, and wherein the barb protrudes radially from the release bar, the release bar configured to be engaged so as to disengage the barb from the catch.

3. The filter cartridge endplate structure of claim 2, wherein the release bar is biased when the barb engages the catch, and wherein displacing the release bar against a biased direction of the release bar towards the filter cartridge endplate structure causes the barb to disengage from the catch, thereby enabling the filter cartridge to be removed from the shell.

4. The filter cartridge endplate structure of claim 1, wherein the first flow portion includes a first channel, the second flow portion includes a second channel, the first and second channels are configured to allow axial fluid flow relative to the plate, and wherein the first and second channels are configured to allow fluid flow that is localized toward the center of the plate.

5. The filter cartridge endplate structure of claim 4, wherein at least one of the first flow portion and the second flow portion includes a side opening in fluid communication with one of the first channel and the second channel.

6. The filter cartridge endplate structure of claim 5, wherein the side opening is configured to direct the fluid away from the center of the plate and toward sides of the plate.

7. The filter cartridge endplate structure of claim 4, wherein the first flow portion and the second flow portion are configured to allow a fluid to be filtered to flow toward the center of the plate and through the first channel of the first flow portion, and configured to allow filtered fluid to flow through the center of the plate and out of the filter cartridge.

8. A filter cartridge comprising a filter media with an endplate structure disposed on each end thereof, one of the endplate structures comprising:

a plate with a major surface;
a retention mechanism comprising:
a retention flange extending from an outer rim of the plate, and
a barb protruding radially from the retention flange, the barb configured to engage a catch provided in a shell so as to retain the filter cartridge within the shell; and
a separator that protrudes axially away from the major surface of the plate, the separator including a first flow portion and a second flow portion, the first flow portion disposed radially inward relative to the second flow portion, the first and second flow portions concentrically arranged relative to the plate and disposed toward a center of the major surface of the plate.

9. The filter cartridge of claim 8, wherein the retention flange comprises a release bar extending axially from the retention flange away from the major surface of the plate, and wherein the barb protrudes radially from the release bar, the release bar configured to be engaged so as to disengage the barb from the catch.

10. The filter cartridge of claim 9, wherein the release bar is biased when the barb engages the catch, and wherein displacing the release bar against a biased direction of the release bar towards the endplate structure causes the barb to disengage from the catch, thereby enabling the filter cartridge to be removed from the shell.

11. The filter cartridge of claim 8, wherein the first flow portion includes a first channel, the second flow portion includes a second channel, the first and second channels are configured to allow axial fluid flow relative to the plate, and wherein the first and second channels are configured to allow fluid flow that is localized toward the center of the plate.

12. The filter cartridge of claim 11, wherein at least one of the first flow portion and the second flow portion includes a side opening in fluid communication with one of the first channel and the second channel.

13. The filter cartridge of claim 12, wherein the side opening is configured to direct the fluid away from the center of the plate and toward sides of the plate.

14. The filter cartridge of claim 8, wherein the first flow portion and the second flow portion are configured to allow a fluid to be filtered to flow toward the center of the plate and through the first channel of the first flow portion, and configured to allow filtered fluid to flow through the center of the plate and out of the filter cartridge.

* * * * *